(12) United States Patent
Namgoong et al.

(10) Patent No.: US 11,996,968 B2
(45) Date of Patent: May 28, 2024

(54) NEURAL AUGMENTATION FOR DEVICE NONLINEARITY MITIGATION IN X-NODE MACHINE LEARNING

(71) Applicant: QUALCOMM Incorporated, San Diego, CA (US)

(72) Inventors: June Namgoong, San Diego, CA (US); Taesang Yoo, San Diego, CA (US); Naga Bhushan, San Diego, CA (US); Krishna Kiran Mukkavilli, San Diego, CA (US); Tingfang Ji, San Diego, CA (US); Hwan Joon Kwon, San Diego, CA (US); Pavan Kumar Vitthaladevuni, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/394,928

(22) Filed: Aug. 5, 2021

(65) Prior Publication Data
US 2022/0070041 A1    Mar. 3, 2022

Related U.S. Application Data

(60) Provisional application No. 63/070,119, filed on Aug. 25, 2020.

(51) Int. Cl.
*H04L 27/26* (2006.01)
*G06N 3/045* (2023.01)

(52) U.S. Cl.
CPC ......... *H04L 27/2614* (2013.01); *G06N 3/045* (2023.01)

(58) Field of Classification Search
CPC ........................... H04L 27/2614; G06N 3/045
See application file for complete search history.

(56) References Cited

U.S. PATENT DOCUMENTS

2021/0266036 A1    8/2021 Namgoong et al.

FOREIGN PATENT DOCUMENTS

WO    WO-2020262906 A1 * 12/2020 ......... H04L 27/2614

OTHER PUBLICATIONS

English machine translation of WO2020262906A1 (Year: 2020).*

(Continued)

*Primary Examiner* — Elton Williams
(74) *Attorney, Agent, or Firm* — QUALCOMM Incorporated

(57) ABSTRACT

Various embodiments include methods for reducing peak to average power ratio of wireless transmission waveforms, performed in transmitter circuitry of a wireless communication. Various embodiments may include receiving frequency domain data tones, transforming the frequency domain data tones to time domain data signals, generating, using a set of peak reduction tone (PRT) neural networks, time domain PRTs using the time domain data signals in which the set of PRT neural networks have been trained in conjunction with an augmentation neural network, and a receiver neural network, generating an output of the augmentation neural network based on an input of final combined time domain signals including the time domain PRTs combined with previous combined time domain signals, and generating time domain wireless transmission waveforms that include the output of the augmentation neural network combined with the final combined time domain signals.

30 Claims, 19 Drawing Sheets

(56) References Cited

OTHER PUBLICATIONS

International Search Report and Written Opinion—PCT/US2021/044936—ISA/EPO—dated Nov. 10, 2021, 15 pages.
Li L., et al., "Improved Tone Reservation Method Based on Deep Learning for PAPR Reduction in OFDM System", 2019, 11th International Conference on Wireless Communications and Signal Processing (WCSP), IEEE, Oct. 23, 2019,6 pages, XP033671896, DOI: 10.1109/WCSP.2019.8928103 [retrieved on Dec. 6, 2019] Sections II. and III. figure 1, p. 1, right-hand column, p. 2, right-hand column—p. 3,left-hand column, paragraph [IIIC].
Wang B., et al., "A Novel Tone Reservation Scheme Based on Deep Learning for PAPR Reduction in OFDM Systems", IEEE Communications Letters, IEEE Service Center, Piscataway, NJ, US, vol. 24, No. 6, Mar. 16, 2020, pp. 1271-1274, XP011792018, ISSN: 1089-7798, DOI: 10.1109/LCOMM.2020.2980832, [retrieved on Jun. 10, 2020] Sections II. and III.; figure 1.
Namgoong J., et al., "Learning Based Transmitter/Receiver Design for the Nonlinear Channel", ICC 2021—IEEE International Conference on Communications, IEEE, Jun. 14, 2021 (Jun. 14, 2021), pp. 1-5, XP033953270, DOI: 10.1109/ICC42927.2021.9501000 [retrieved on Jul. 28, 2021] Section III.

* cited by examiner

NEURAL AUGMENTATION FOR DEVICE NONLINEARITY MITIGATION IN X-NODE MACHINE LEARNING

RELATED APPLICATIONS

This application claims the benefit of priority to U.S. Provisional Patent Application No. 63/070,119 entitled "Neural Augmentation For Device Nonlinearity Mitigation In X-Node Machine Learning" filed Aug. 25, 2020, the entire contents of which are incorporated herein by reference

BACKGROUND

In wireless communication systems, such as those specified under standards for Fifth Generation (5G) New Radio (NR), the conventional using orthogonal frequency-division multiplexing (OFDM) waveform suffers from large peak-to-average power ratio (PAPR). Mitigating large PAPR can necessitate large amounts of power amplifier back-off, at the cost of degraded power amplifier efficiency.

SUMMARY

Various aspects include systems and methods for reducing peak to average power ratio of wireless transmission waveforms, performed in transmitter circuitry of a wireless communication device, such as a base station and mobile wireless devices. Aspects may include receiving frequency domain data tones, transforming the frequency domain data tones to time domain data signals, generating, using a set of peak reduction tone (PRT) neural networks, time domain PRTs using the time domain data signals, wherein the set of PRT neural networks have been trained in conjunction with an augmentation neural network and a receiver neural network, generating an output of the augmentation neural network based on an input of final combined time domain signals including the time domain PRTs combined with previous combined time domain signals, and generating time domain wireless transmission waveforms that include the output of the augmentation neural network combined with the final combined time domain signals.

Some aspects may further include generating real number feature maps of the final combined time domain signals and real number feature maps of a function of the final combined time domain signals, in which generating the output of the augmentation neural network based on the input of final combined time domain signals may include generating the output of the augmentation neural network based on an input of real number feature maps of the final combined time domain signals and the real number feature maps of the function of the final combined time domain signals.

Some aspects may further include generating a complex number feature map of the final combined time domain signals and a complex number feature map of a function of the final combined time domain signals, in which generating the output of the augmentation neural network based on the input of final combined time domain signals comprises generating the output of the augmentation neural network based on an input of the complex number feature map of the final combined time domain signals and the complex number feature map of the function of the final combined time domain signals.

Some aspects may further include training the augmentation neural network using a weighted average of a first error and a second error, in which the first error from a comparison of a reconstruction of the frequency domain data tones and the frequency domain data tones and, in which the second error is of a distortion function output based on an energy outside an allocated band.

Some aspects may further include training the set of PRT neural networks using the weighted average of the first error and the second error.

Some aspects may further include determining whether the wireless communication device is configured to implement the augmentation neural network, and selecting a neural network implementation from a group of neural network implementations based on a modulation and coding scheme in response to determining that the wireless communication device is configured to implement the augmentation neural network.

Some aspects may further include transmitting the time domain wireless transmission waveforms to another wireless communication device having the receiver neural network.

Some aspects may further include receiving a neural network indicator, from another wireless communication device having the receiver neural network, configured to indicate to the wireless communication device the augmentation neural network that has been trained with the set of PRT neural networks and the receiver neural network, and selecting the augmentation neural network based on the neural network indicator from a plurality of augmentation neural networks.

Some aspects may further include receiving weights for the augmentation neural network from the other wireless communication device, in which generating the time domain wireless transmission waveforms that include the output of the augmentation neural network combined with the final combined time domain signals may include generating the time domain wireless transmission waveforms using the weights for the augmentation neural network.

Further aspects may include a wireless communication device having transmitting circuitry and/or receiving circuitry configured to perform operations of any of the methods summarized above. Further aspects may include a wireless computing device having means for performing functions of any of the methods summarized above. Further aspects may include a non-transitory, processor-readable medium having stored thereon processor-executable instructions configured to cause a processor of a wireless computing device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

Like reference numbers and designations in the various drawings indicate like elements.

DETAILED DESCRIPTION

Figure 1:
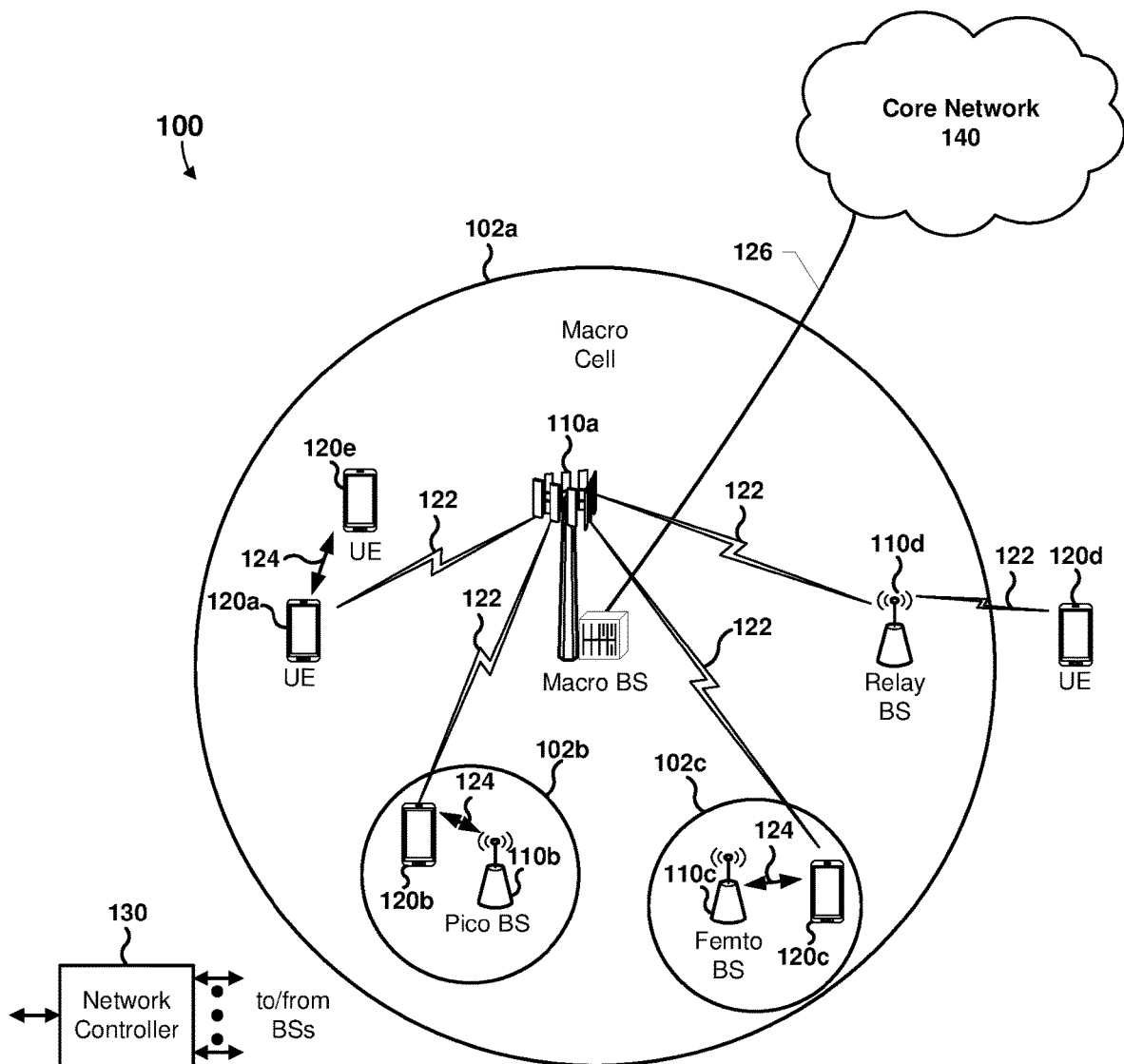
FIG. 1 is a system block diagram illustrating an example of a communications system suitable for implementing any of the various embodiments.

The following description is directed to certain embodiments for the purposes of describing the innovative aspects of this disclosure. However, a person having ordinary skill in the art will readily recognize that the teachings herein may be applied in a multitude of different ways.

Various embodiments provide methods that may be implemented in wireless communication devices (e.g., base stations, wireless access points, mobile devices, etc.) that make use of a trained PRT neural network module on the transmitter side of a wireless communication link to determine PRTs suitable for a given transmission and make use of an associated trained receiver neural network module on the receiver side of the wireless communication link remove PRTs from a received signal and extract information regarding the target data tones that is carried by the PRTs.

The described embodiments may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, Fifth Generation (5G) New Radio (NR), or other signals that are used to communicate within a wireless, cellular or Internet of Things (IoT) network, such as a system utilizing 3G, 4G, or 5G technology, or further embodiments thereof.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (such as smart rings, smart bracelets, etc.), entertainment devices (such as wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The conventional orthogonal frequency-division multiplexing (OFDM) waveform adopted in the 5G NR specification suffers from large peak-to-average power ratio (PAPR). Without other mitigation of PAPR of a waveform, the transmitter may need to reduce power amplification (i.e., implement power amplifier back-off), at the cost of the degraded power amplifier efficiency in order to avoid distortion caused by the power amplifier nonlinearity. A signal processing approach to PAPR reduction includes a tone reservation scheme, in which peak reduction tones (PRT) that are orthogonal to data tones are used to shape the transmission waveforms, i.e., an OFDM symbols containing the PRTs and the data tones, in the time domain. The PRTs are designed to reduce the peaks in the amplitude of the transmission waveforms in the time domain. However, there is no known relation between the data tones and the PRTs when the PRTs are found by the traditional signal processing algorithms. In other words, mapping between the data tones and the PRTs can be arbitrary. As such, a receiver is indifferent to the content of the PRTs, and the PRTs only present overhead to the receiver. When PRTs are paired with data tones, the peak power of the transmission waveform are reduced at the cost of the increased average transmission power and the error vector magnitude (EVM) is maintained for the data tones.

The embodiments described herein use machine learning trained neural networks configured to map data tones to PRTs for transmission from a specific transmitter and/or for transmission to a specific receiver. Machine learning may be used to train a PRT neural network and a receiver neural network pair. In some embodiments, the PRT neural network may be trained to pair a data tone and a PRT based on an input of a data signal in the time domain derived from the data tone in the frequency domain. The receiver neural network may be trained to demodulate a transmission waveform of an OFDM symbol in the time domain having the data tone and the PRT to generate a reconstruction of the data tone in the frequency domain based on an input of the transmission waveform. In some embodiments, the PRT neural network and the receiver neural network may be trained for a specific transmitter, such as based on a hardware configuration of a transmitter. In some embodiments, the PRT neural network and the receiver neural network may be trained for a specific receiver, such as based on a hardware configuration of a receiver.

In some embodiments, a transmitter and a receiver may share configurations of a PRT neural network and/or a receiver neural network. For example, a transmitter, such as a wireless device, may share with a receiver, such as a base station or a node, a configuration of a receiver neural network, which may be the receiver neural network trained in conjunction with a PRT neural network and an augmentation neural network implemented by the transmitter, for the receiver to implement. As a further example, the receiver may share with the transmitter a configuration of a PRT neural network and an augmentation neural network, which may be the PRT neural network and the augmentation neural network trained in conjunction with the receiver neural network implemented by the receiver, for the transmitter to implement.

In some embodiments, the transmitter and the receiver may be preconfigured with multiple PRT neural networks and/or receiver neural networks, and sharing the configurations of a PRT neural network and/or a receiver neural network may include sharing an indicator of a configuration of a PRT neural network and/or a receiver neural network. The transmitter and/or the receiver may use the indicator to select the configuration of the PRT neural network and/or the receiver neural network.

In some embodiments, sharing the configurations of a PRT neural network and/or a receiver neural network may include sharing weights resulting from the training of the PRT neural network and/or the receiver neural network. Sharing the configurations of a PRT neural network and/or a receiver neural network may include sending the indicator and/or the weights to the transmitter and/or the receiver.

In some embodiments, the transmitter may use a default PRT neural network and/or a PRT neural network selected in response to receiving an indicator of the configuration of the PRT neural network to generate a PRT for a data tone. The transmitter may generate a transmission waveform by combining the data tones and the PRTs. The transmitter may transmit the transmission waveform to the receiver. The receiver may receive the transmission waveform and use a default receiver neural network and/or a receiver neural network selected in response to receiving an indicator of the configuration of the receiver neural network to demodulate the transmission waveform in order to reconstruct the data tones. For a PRT neural network and a receiver neural network trained together, the PRT neural network used to generate the PRTs to combine with the data tones to generate the transmission waveform may be known to a receiver implementing the receiver neural network. As such, the PRT may contain information to facilitate generating a reconstruction of the data tones. The information contained in the PRT may improve demodulation performance, such as improving accuracy of a reconstruction of the data tones compared to sending the PRTs generated by a traditional signal processing algorithm.

FIG. 1 is a system block diagram illustrating an example communications system 100 suitable for implementing any of the various embodiments. The communications system 100 may be a 5G New Radio (NR) network, or any other suitable network such as a Long Term Evolution (LTE) network.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as a NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communications system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time-division duplexing (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-120e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
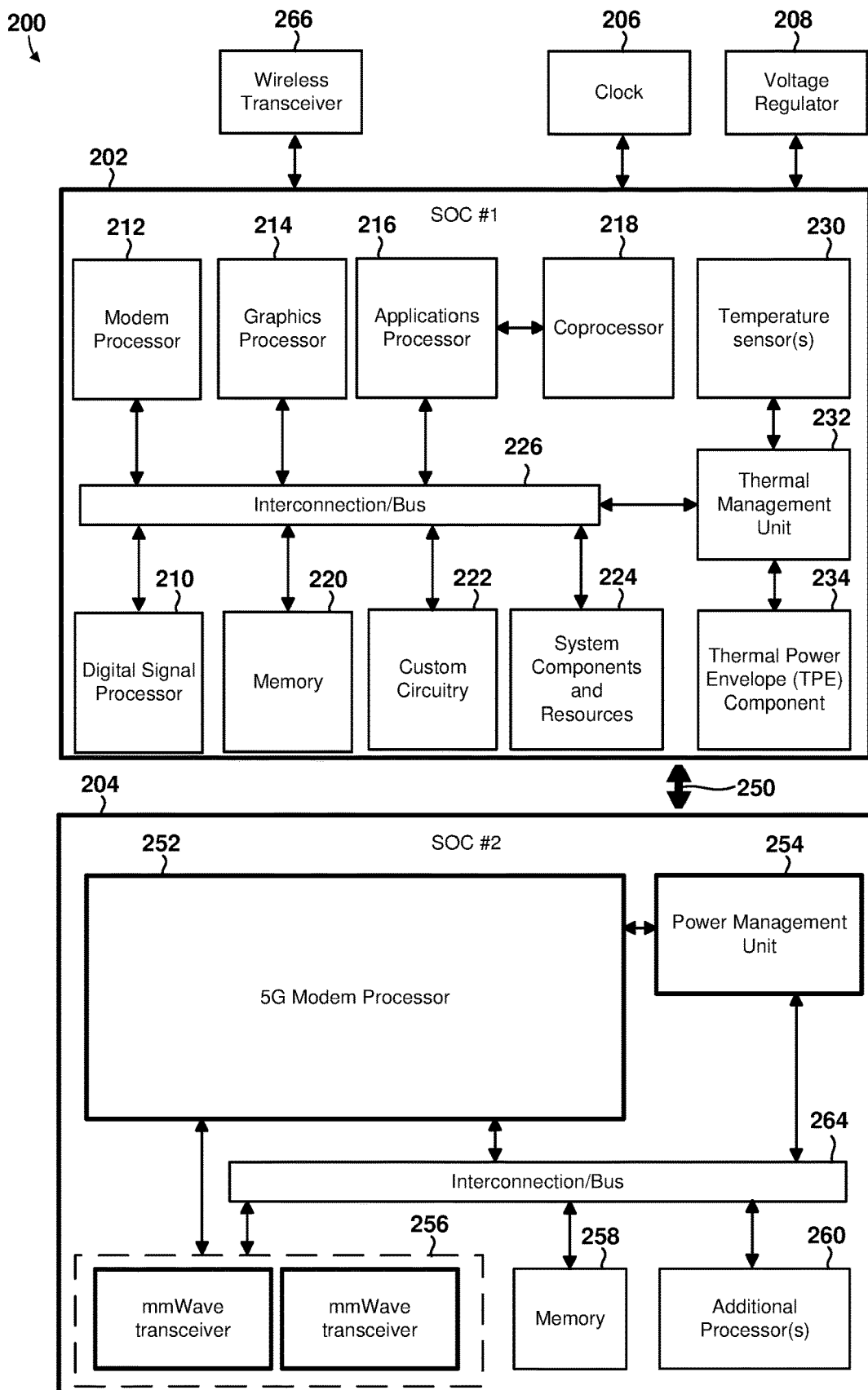
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
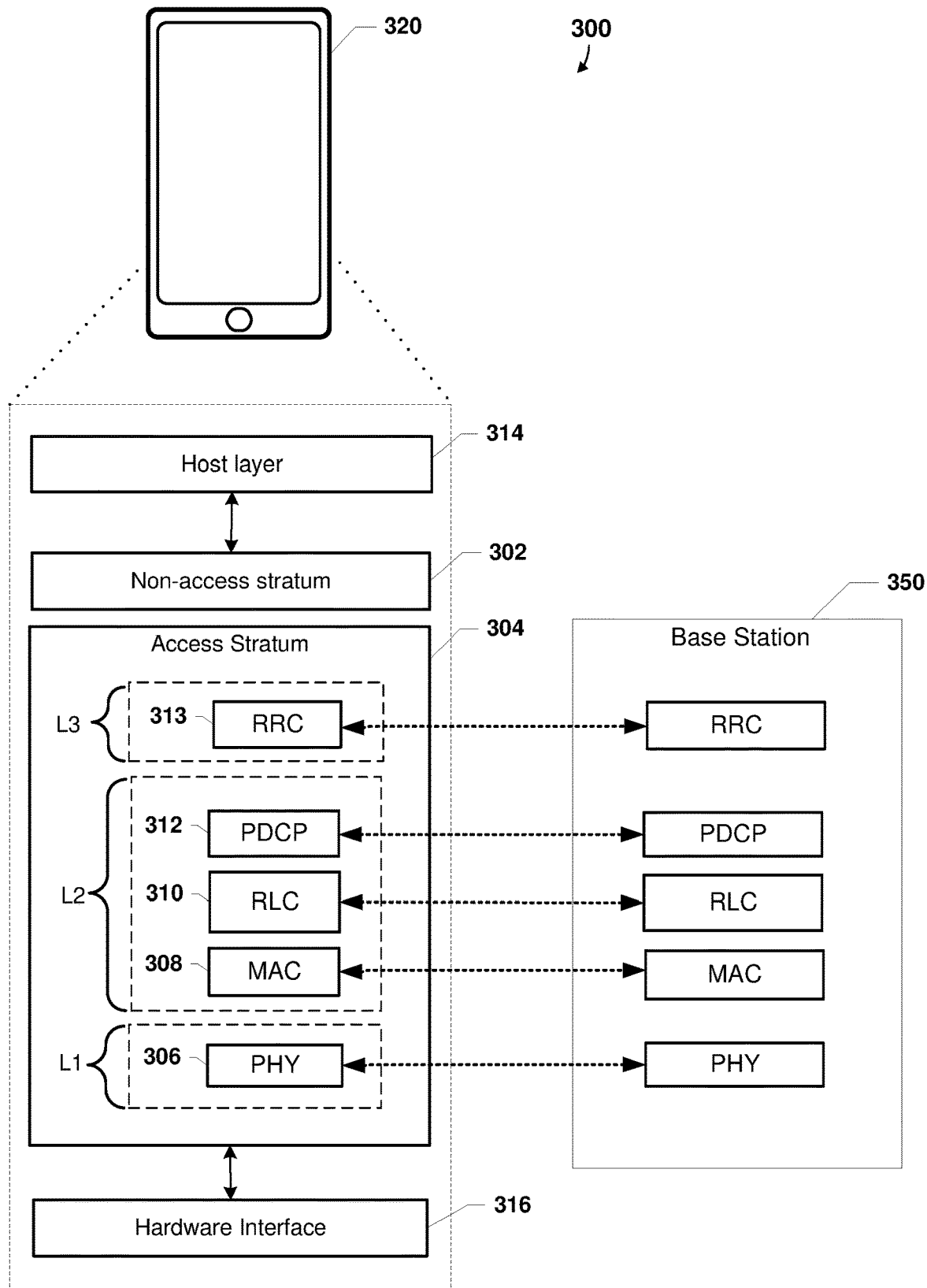
FIG. 3 is a component block diagram illustrating am example of a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 256). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the processor.

In other embodiments, the software architecture 300 may include one or more higher logical layers (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
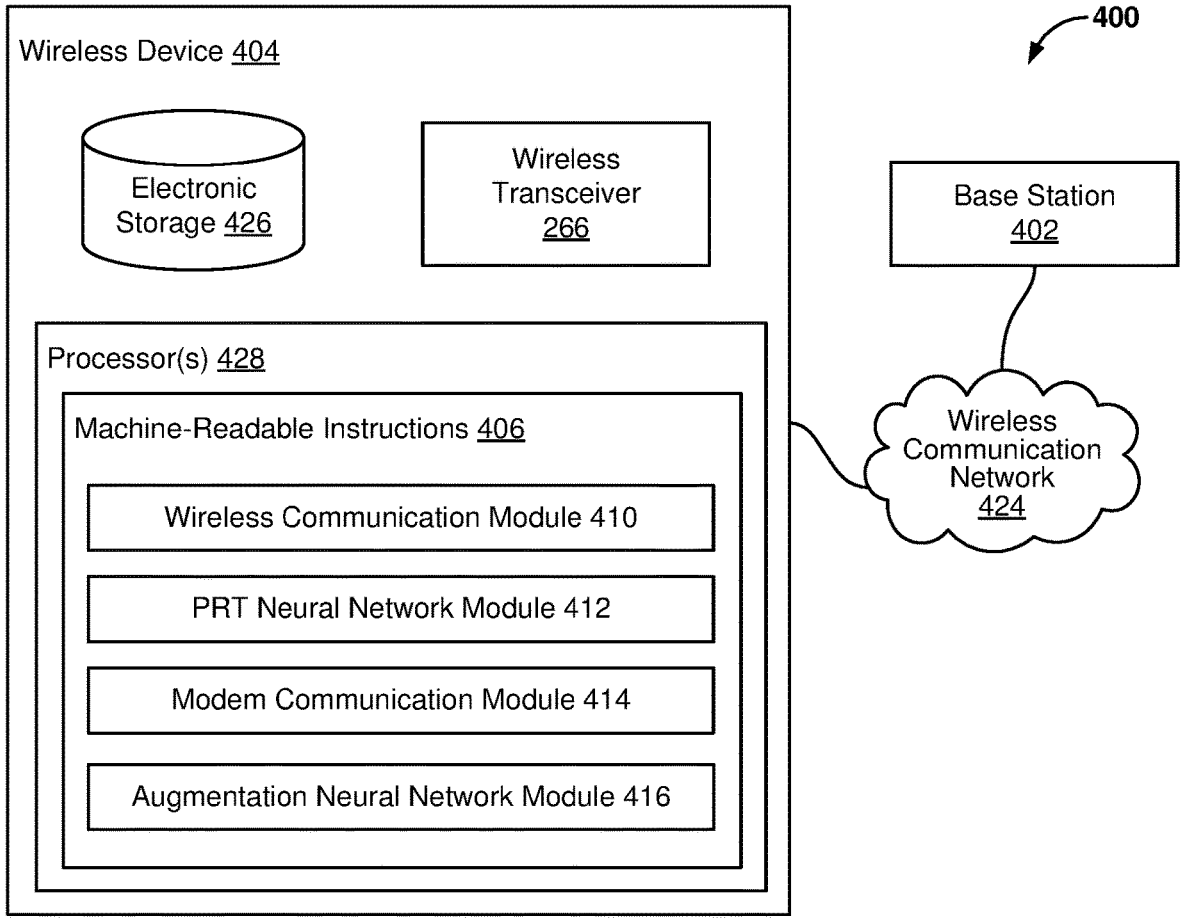
FIGS. 4A and 4B are component block diagrams illustrating an example of a system configured for managing information transmission for wireless communication for implementing any of the various embodiments.
Figure 4B:
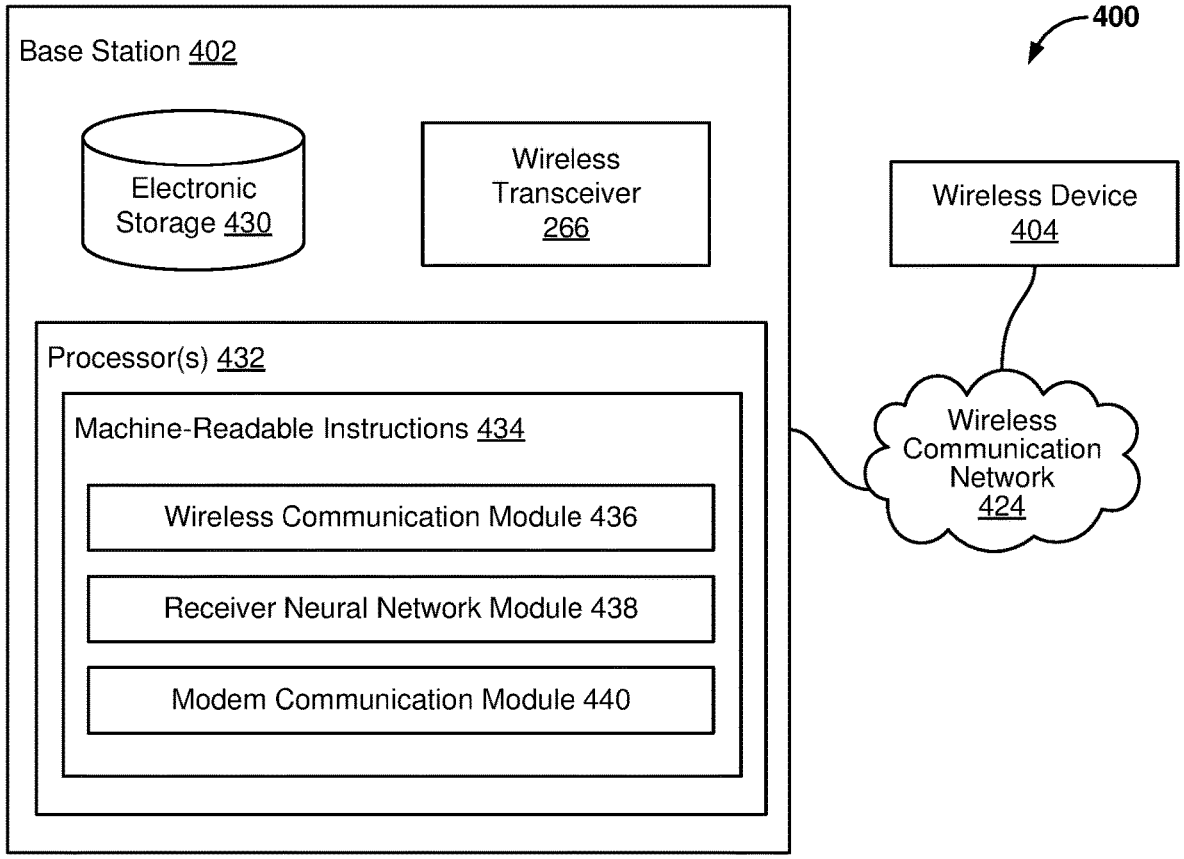

FIGS. 4A and 4B are component block diagrams illustrating a system 400 configured for managing information transmission for wireless communication in accordance with various embodiments. With reference to FIGS. 1-4B, system 400 may include a base station 402 (e.g., 120a-120e, 200, 320) and a wireless device 404 (e.g., 120a-120e, 200, 320). The base station 402 and the wireless device 404 may communicate over a wireless communication network 424 (aspects of which are illustrated in FIG. 1).

The base station 402 and/or the wireless device 404 may include one or more processors 428, 432 (e.g., 210, 212, 214, 216, 218, 252, 260) coupled to electronic storage 426, 430 and a wireless transceiver 266. The wireless transceiver 266 may be configured to receive messages to be sent in uplink transmissions from the processor(s) 428, 432, and to transmit such messages via an antenna (not shown) to a wireless communication network 424 for relay to the base station 402 and/or wireless device 404. Similarly, the wireless transceiver 266 may be configured to receive messages from the base station 402 and/or wireless device 404 in downlink transmissions from the wireless communication network 424 and pass the messages (e.g., via a modem (e.g., 252) that demodulates the messages) to the one or more processors 428, 432.

The processor(s) 428, 432 may be configured by machine-readable instructions 406, 434. Machine-readable instructions 406 may include one or more instruction modules. The instruction modules may include computer program modules. The instruction modules may include one or more of a neural network training module 410, 436, a PRT neural network module 412, an augmentation neural network module 416, a receiver neural network module 438, a wireless communication module 414, 440, or other instruction modules.

The neural network training module 410, 436 may be configured to train the PRT neural network and/or a receiver neural network on a data set of data tones and for accurate reconstruction of the data tones, within a threshold of error.

The PRT neural network module 412 may be configured to apply a PRT neural network to the data tones to generate PRTs for combination with the data tones to reduce PAPR of the transmission waveforms. The PRT neural network may be trained to generate PRTs so that a trained receiver neural network can accurately generate reconstructions of the data tones from transmission waveforms that are made up of a combination of the data tones and the PRTs.

The augmentation neural network module 416 may be configured to apply an augmentation neural network to augment the outputs of the PRT neural network. The augmentation neural network may correct the output produced by the PRT neural network. The augmentation neural network may compensate for differences between the assumptions used when designing the PRT neural network, which may implement a traditional PRT calculation algorithm, and the reality of the circuitry and environment which the PRT neural network is not designed to fully account for.

The receiver neural network module 438 may be configured to apply a receiver neural network to the transmission waveforms to accurately generate reconstructions of data tones. The receiver neural network may be trained so that the generated PRTs from a trained PRT neural network provide information to a trained receiver neural network to aid in accurately generating reconstructions of data tones from transmission waveforms made up of a combination of the data tones and PRTs.

The wireless communication module 414, 440 may be configured to transmit indicators of the PRT neural network and/or receiver neural network, weights of the PRT neural network and/or receiver neural network, and/or the transmission waveforms between the wireless device 404 and the base station 402.

In some embodiments, the base station 402 and wireless device 404 may be operatively linked via one or more electronic communication links. For example, such electronic communication links may be established, at least in part, via a network such as the Internet and/or other networks. However, this example is not intended to be limiting, and the scope of this disclosure includes embodiments in which the base station 402 and wireless device 404 may be operatively linked via some other communication media.

The electronic storage 426, 430 may include non-transitory storage media that electronically stores information. The electronic storage media of electronic storage 426, 430 may include one or both of system storage that is provided integrally (i.e., substantially non-removable) with the base station 402 or wireless device 404 and/or removable storage that is removably connectable to the base station 402 or wireless device 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the base station 402 or wireless device 404, or other information that enables the base station 402 or wireless device 404 to function as described herein.

Processor(s) 428, 432 may be configured to provide information processing capabilities in the base station 402. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 410-416 and modules 436-440 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 410-416 and modules 436-440 described herein is for illustrative purposes, and is not intended to be limiting, as any of modules 410-416 and modules 436-440 may provide more or less functionality than is described. For example, one or more of the modules 410-416 and modules 436-440 may be eliminated, and some or all of its functionality may be provided by other modules 410-416 and modules 436-440. As another example, the processor(s) 428, 432 may be configured to execute one or more additional modules that may perform some or all of the functionality attributed below to one of the modules 410-416 and modules 436-440.

Figure 5A:
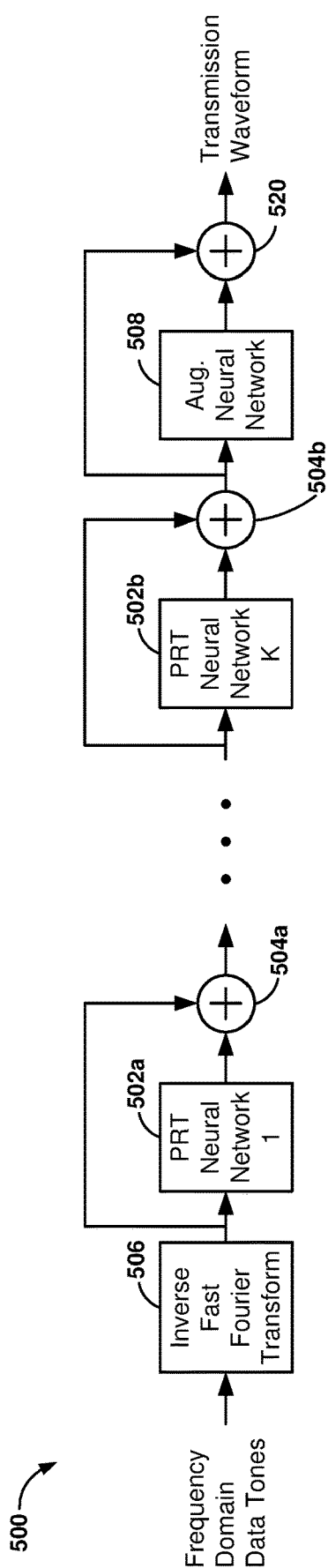
FIGS. 5A and 5B are component block diagrams illustrating examples of an encoder circuit configured to implement machine learning and/or machine learning based encoding for nonlinearity mitigation using peak reduction tones (PRTs) and neural augmentation in accordance with various embodiments.

FIG. 5A illustrates a functional block diagram including an example encoder circuit 500 configured to implement machine learning and/or machine learning based encoding for combining time domain data signals, derived from frequency domain data tones, and time domain PRTs into a transmission waveform in accordance with various embodiments. With reference to FIGS. 1-5A, a transmitter (e.g., wireless device 120a-120e, 200, 320, 404) may include an encoder 500. The encoder 500 may be implemented in hardware, software executing on a processor, and/or a combination of hardware and software executing on the processor. The encoder 500 may be may be a standalone component of the transmitter, an integral component of an SoC (e.g., SoC 202, 204), and/or an integral hardware and/or software component of a processors (e.g., processors 210, 212, 214, 216, 218, 252, 260, 428). The encoder 500 may include any number and combination of PRT neural networks 502a, 502b, an augmentation neural network ("Aug. Neural Network" in FIG. 5A) 508, any number and combination of signal summers 504a, 504b, 520, and an inverse fast Fourier transform component 506. The encoder 500 may use machine learning trained PRT neural networks 502a, 502b and an augmentation neural network 508 configured to map frequency domain data tones and PRTs for transmission from a specific transmitter and/or to a specific receiver.

Figure 5B:
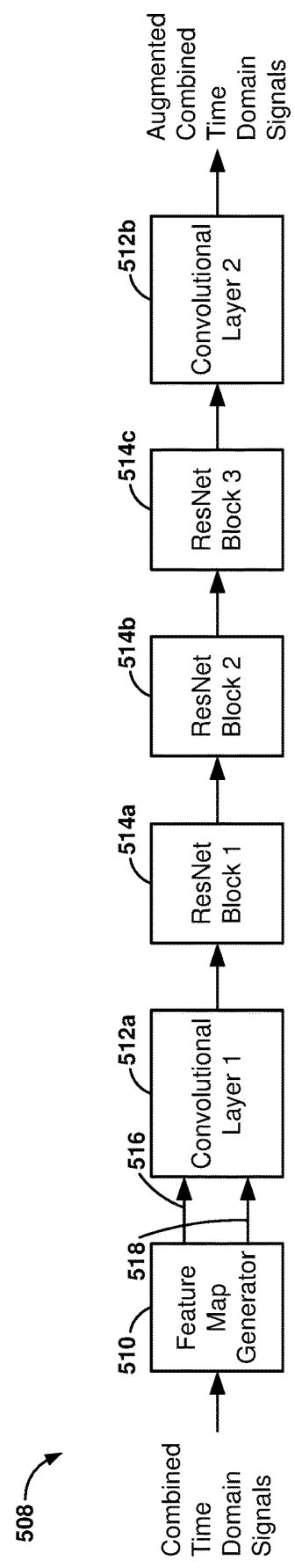

FIG. 5B illustrates a functional block diagram including an example augmentation neural network 508 configured to implement neural augmentation of the machine learning and/or machine learning based encoding for combining time domain data signals, derived from frequency domain data tones, and time domain PRTs into a transmission waveform in accordance with various embodiments. With reference to FIGS. 1-5B, a transmitter (e.g., wireless device 120a-120e, 200, 320, 404) may include an augmentation neural network 508. The augmentation neural network 508 may be implemented in hardware, software executing on a processor, and/or a combination of hardware and software executing on the processor. The augmentation neural network 508 may be may be a standalone component of the transmitter, an integral component of an SoC (e.g., SoC 202, 204), and/or an integral hardware and/or software component of a processors (e.g., processors 210, 212, 214, 216, 218, 252, 260, 428). The augmentation neural network 508 may include a feature map generator 510 and neural network layers 512a, 512b, 514a, 514b, 514c.

The augmentation neural network 508 may be a machine learning trained neural network configured to augment the outputs of the previous PRT neural networks 502a, 502b. In some embodiments, the augmentation neural network 508 may correct the output produced by a traditional PRT calculation algorithm, or the output produced by previous PRT neural networks 502a, 502b configured to implement an unrolling of the traditional PRT calculation algorithm. The performance of the previous PRT neural networks 502a, 502b may be limited by the traditional PRT calculation algorithm that the PRT neural networks 502a, 502b implement. Augmenting the outputs of the previous PRT neural networks 502a, 502b may enhance the performance of the PRT neural networks 502a, 502b. This may be accomplished by configuring the augmentation neural network 508 to modify the output of the traditional PRT calculation algorithm generated by the PRT neural networks 502a, 502b so as to suppress any power peaks that remain in the transmission waveform output from the neural networks 502a, 502b the neural networks 502a, 502b. Augmenting the outputs of the previous PRT neural networks 502a, 502b by the augmentation neural network 508 may boost power and/or mitigate nonlinearity of time domain transmission waveforms generated by the encoder 500.

In particular, the augmentation neural network 508 may compensate for differences between the assumptions used when designing the traditional PRT calculation algorithm and the reality of the circuitry and environment which the traditional PRT calculation algorithm is not designed to fully account for. For example, in circuitry and/or an environment in which the traditional PRT calculation algorithm fails to perform well, neural network augmentation, implemented by the augmentation neural network 508, may implement functions that the traditional PRT calculation algorithm fails to achieve, making the overall system more robust by further reducing PAPR. As another example, the augmentation neural network 508 may provide functionality that is not captured by the PRT neural networks 502a, 502b, such as: compensating for major components that are missing in a data path, enhancing embedding of distortion information in the time domain transmission waveform to improve decoder gain, compensating for any uncompensated non-idealities in the RF chain that engineers failed to capture in the design, etc.

Figure 6A:
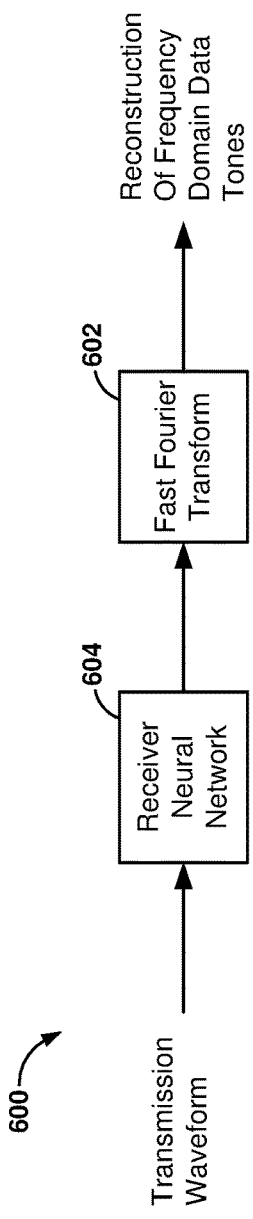
FIGS. 6A and 6B are component block diagrams illustrating an example of a neural network decoder configured to implement machine learning and/or machine learning based decoding for nonlinearity mitigation using PRTs and neural augmentation in accordance with various embodiments.

FIG. 6A illustrates an example decoder 600 configured to implement machine learning and/or machine learning based decoding to extract PRTs from a received transmission waveform and use information from this process to improve receiver performance in estimating the original data tone in accordance with various embodiments. With reference to FIGS. 1-6A, a receiver (e.g., base station 110a-110d, 350, 402) may include a decoder 600. The decoder 600 may be implemented in hardware, software executing on a processor, and/or a combination of hardware and software executing on the processor. The decoder 600 may be may be a standalone component of the receiver, an integral component of an SoC (e.g., SoC 202, 204), and/or an integral hardware and/or software component of a processors (such as the processors 210, 212, 214, 216, 218, 252, 256, 260, 432). The decoder 600 may include a fast Fourier transform component 602 and a receiver neural network 604. The decoder 600 may use machine learning trained neural networks configured to demodulate transmission waveforms, including time domain data signals, derived from frequency domain data tones, and time domain PRTs, received from a specific transmitter and/or by a specific receiver.

Figure 6B:
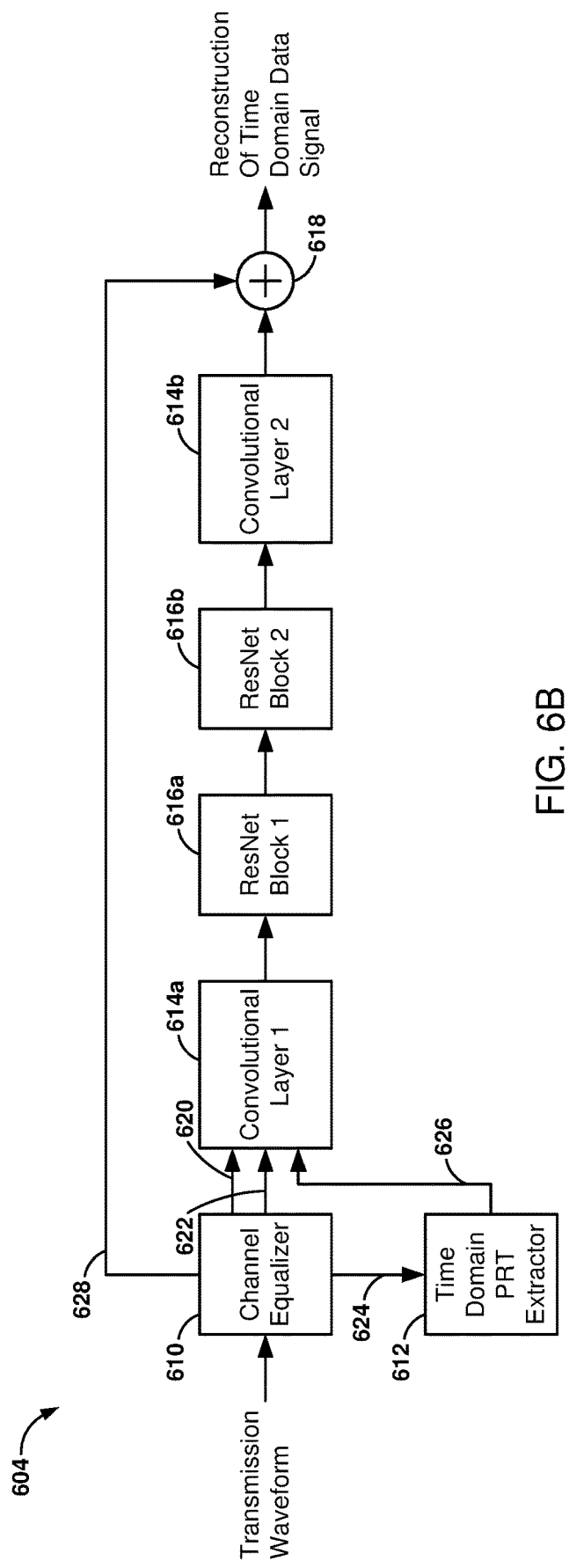

FIG. 6B illustrates an example receiver neural network 604 configured to implement machine learning and/or machine learning based decoding to extract PRTs from a received transmission waveform and use information from this process to improve receiver performance in estimating the original data tone in accordance with various embodiments. With reference to FIGS. 1-6B, a receiver (e.g., base station 110a-110d, 350, 402) may include a receiver neural network 604. The receiver neural network 604 may be implemented in hardware, software executing on a processor, and/or a combination of hardware and software executing on the processor. The receiver neural network 604 may be may be a standalone component of the receiver, an integral component of an SoC (e.g., SoC 202, 204), and/or an integral hardware and/or software component of a processors (such as the processors 210, 212, 214, 216, 218, 252, 256, 260, 432). The receiver neural network 604 may include a channel equalizer component 610, a time domain PRT extractor component 612, neural network layers 614a, 614b, 616a, 616b, and a signal summer 618. The receiver neural network 604 may be a machine learning trained neural network configured to demodulate transmission waveforms, including time domain data signals, derived from frequency domain data tones, and time domain PRTs, received from a specific transmitter and/or by a specific receiver.

Referring to FIGS. 5A, 5B, 6A, and 6B together, machine learning may be used to train a set of PRT neural networks 502a, 502b and the augmentation neural network 508, and the receiver neural network 604 pair. Machine learning methods may be implemented on the transmitter and/or the receiver separately, during which the transmitter and/or the receiver may implement the set of the PRT neural networks 502a, 502b, the augmentation neural network 508, and the receiver neural network 604. The set of PRT neural networks 502a, 502b and the augmentation neural network 508 may be trained to receive time domain data signals derived from frequency domain data tones as inputs and output a transmission waveform based on combination of the time domain PRTs with the time domain data signals and/or combined time domain data signals resulting from previous combinations in signal summers 504a, 504b. The time domain data signals may be derived from the frequency domain data tones by transforming the frequency domain data tones to the time domain data signals by an inverse fast Fourier transform component 506. The result of the successive combinations of the time domain PRTs with the time domain data signals and the combined time domain data signals is a transmission waveform with reduced peaks to reduce PAPR suitable for amplification for transmission. On the receiver side, a receiver neural network 604 may be trained to demodulate the transmission waveform, that is a combination of the frequency domain data tones represented in the time domains by the time domain data signals, and the time domain PRTs, to generate a reconstruction of the frequency domain data tones based on an input of the transmission waveform.

In a non-limiting example, the set of PRT neural networks 502a, 502b and the augmentation neural network 508, and the receiver neural network 604 pair may be implemented as an autoencoder using unsupervised machine learning. The set of PRT neural networks 502a, 502b and the augmentation neural network 508, and the receiver neural network 604 pair may be trained such that the set of PRT neural networks 502a, 502b and/or the augmentation neural network 508 generate a PRTs to combine with time domain data signals so that the receiver neural network 604 may accurately generate a reconstruction of the time domain data signals, such as within a threshold of error. In some embodiments, the error may be determined by comparison of a reconstruction of the frequency domain data tones, derived from the reconstruction of the time domain data signals, to the frequency domain data tones. In some embodiments, the error in the reconstruction of the frequency domain data tones may be calculated as the mean-squared error between the frequency domain data tones and the reconstruction of the frequency domain data tones. In some embodiments, the error may be determined by a distortion function output based on an energy outside the allocated band. In some embodiments, a total error may be obtained by a weighted average of the error from the comparison of a reconstruction of the frequency domain data tones to the frequency domain data tones (error1) and the error from the distortion function output (error2). For example, the total error may=error1+ $\alpha$*error2, for some "$\alpha$" that may be found during hyperparameter tuning.

In some embodiments, the set of PRT neural networks 502a, 502b, the augmentation neural network 508, and the receiver neural network 604 may be trained for a specific transmitter, such as by being trained using the hardware configuration of the transmitter.

In some embodiments, the set of PRT neural networks 502a, 502b, the augmentation neural network 508, and the receiver neural network 604 may be trained for a specific receiver, such as by being trained using a hardware configuration of the receiver. For example, the set of PRT neural networks 502a, 502b and the augmentation neural network 508, and receiver neural network 604 pair may be trained using a specific transmitter and/or a transmitter similar to the specific transmitter, such as a transmitter that uses a same hardware and/or software configuration, such as a benchmark transmitter. As a further example, the set of PRT neural networks 502a, 502b and the augmentation neural network 508, and receiver neural network 604 pair may be trained using a specific receiver and/or a receiver similar to the specific receiver, such as a receiver that uses a same hardware and/or software configuration, such as a benchmark receiver.

A transmitter and a receiver may share configurations of the set of PRT neural networks 502a, 502b, the augmentation neural network 508, and/or the receiver neural network 604. The transmitter may share the configurations of the receiver neural network 604 by wirelessly transmitting the configurations of the receiver neural network 604 to the receiver. For example, the transmitter may share with the receiver a configuration of the receiver neural network 604 for the receiver to implement, which may be the receiver neural network 604 trained in conjunction with the set of PRT neural networks 502a, 502b and the augmentation neural network 508 implemented by the transmitter.

In some embodiments, the receiver may be preconfigured with multiple receiver neural networks 604. Sharing the configuration of the receiver neural network 604 may include sharing an indicator of a configuration of the receiver neural network 604. The receiver may use the indicator to select the configuration of the receiver neural network 604 from the multiple receiver neural networks 604.

In some embodiments, sharing the configurations of the receiver neural network 604 may include sharing weights resulting from the training of the set of PRT neural networks 502a, 502b and the augmentation neural network 508, and/or the receiver neural network 604. Sharing the configurations of the receiver neural network 604 may include sending the indicator and/or the weights to the receiver. In some embodiments, the weights may be the indicator.

The receiver may share the configurations of the set of PRT neural networks 502a, 502b and the augmentation neural network 508 by wirelessly transmitting the configurations of the set of PRT neural networks 502a, 502b and the augmentation neural network 508 to the transmitter. For example, the receiver may share with the transmitter a configuration of the set of PRT neural networks 502a, 502b and the augmentation neural network 508 for the transmitter to implement, which may be the set of PRT neural networks 502a, 502b and the augmentation neural network 508 trained in conjunction with the receiver neural network 604 implemented by the receiver. In some embodiments, the transmitter may be preconfigured with multiple sets of PRT neural networks 502a, 502b and multiple augmentation neural networks 508. Sharing the configurations of the set of PRT neural networks 502a, 502b and the augmentation neural network 508 may include sharing an indicator of a configuration of the set of PRT neural networks 502a, 502b and the augmentation neural network 508. The transmitter may use the indicator to select the configuration of the set of PRT neural networks 502a, 502b and the augmentation neural network 508 from the multiple sets of PRT neural networks 502a, 502b and augmentation neural networks 508. In some embodiments, sharing the configurations of the set of PRT neural networks 502a, 502b and the augmentation neural network 508 may include sharing weights resulting from the training of the set of PRT neural networks 502a, 502b and the augmentation neural network 508 and/or the receiver neural network 604. Sharing the configurations of the set of PRT neural networks 502a, 502b and the augmentation neural network 508 may include sending the indicator and/or the weights to the transmitter. In some embodiments, the weights may be the indicator.

The transmitter may use the set of PRT neural networks 502a, 502b and the augmentation neural network 508 to generate time domain PRTs to reduce PAPR within the transmitter, and then the receiver may use a corresponding trained receiver neural network 604 in demodulating (i.e., decoding) transmitted waveforms received from the transmitter. In various embodiments, the transmitter may use a trained set of PRT neural networks 502a, 502b and the augmentation neural network 508 to generate time domain PRTs as frequency domain data tones are received for transmission (i.e., generating PRTs "on the fly"). By using a receiver neural network 604 that was trained in conjunction with (or using outputs from) the transmitter set of PRT neural networks 502a, 502b and the augmentation neural network 508, the receiver may more accurately reconstruct frequency domain data tones from the received waveform than achievable using conventional demodulation circuitry. To enable this benefit, some embodiments include operations to coordinate between the transmitter and the receiver so that the trained set of PRT neural networks 502a, 502b and the augmentation neural network 508 used in the transmitter corresponds to the trained receiver neural network 604 used in the receiver and vice versa. In some embodiments, the transmitter may use a set of PRT neural networks 502a, 502b and the augmentation neural network 508 selected in response to receiving an indicator of the configuration of the set of PRT neural networks 502a, 502b and the augmentation neural network 508. In some embodiments, the transmitter may use a set of PRT neural networks 502a, 502b and the augmentation neural network 508 that is preconfigured on the transmitter.

An inverse fast Fourier transform component 506 of the transmitter may receive the frequency domain data tones and convert the frequency domain data tones to time domain data signals. A first PRT neural network 502a may receive the time domain data signals and generate time domain PRTs for the time domain data signals. A first signal summer 504a may combine the time domain data signals and the PRTs generated by the first PRT neural network 502a generating a first combined time domain signals. A successive PRT neural network, such as a second PRT neural network 502b, may receive the first combined time domain signals and generate time domain PRTs for the first combined time domain signals. A second signal summer 504b may combine the first combined time domain signals and the PRTs generated by the second PRT neural network 502b generating second combined time domain signals. In some embodiments, a successive PRT neural network (not shown) may receive the second combined time domain signals and generate time domain PRTs for the second combined time domain signals. A successive signal summer (not shown) may combine the second combined time domain signals and the PRTs generated by the successive PRT neural network generating third combined time domain signals. In some embodiments, further successive PRT neural networks may continue the pattern of generating PRTs for previous combined time domain signals, and further successive signal summers may combine the PRTs and the previous combined time domain signals generating successive combined time domain signals.

In some embodiments, the PRT neural networks 502a, 502b may execute traditional PRT calculation algorithms. For example, the PRT neural networks 502a, 502b may generate outputs according the following equation:

$$-\mu \sum_{l=0}^{N_{FFT}} Relu(|x(l)| - A) \cdot \frac{x(l)}{|x(l)|} circshift(p, l)$$

in which "x" is a vector of time domain samples that are input to the PRT neural networks 502a, 502b; "x(l)" is the l-th element of the vector "x"; "$N_{FFT}$" is a size of an inverse Fourier transform for each OFDM symbol; "p" is a kernel vector corresponding to the PRT tone locations; and "A" and "μ" are values learned during training, the value of which may be specific to the PRT neural network 502a, 502b. Each PRT neural network 502a, 502b may correspond to an iteration of a traditional PRT calculation algorithm. However, unlike traditional PRT calculation algorithms in which the values of "A" and "μ" remain the same for each iteration of the algorithms, the PRT neural networks 502a, 502b based on traditional PRT calculation algorithms will learn "A" and "μ" values that may vary from iteration to iteration (e.g., from PRT neural network 502a to PRT neural network 502b) depending the results of training. The kernel vector "p" may constrain the PRT neural networks 502a, 502b to produce corrections of the previous PRT values at each iteration, resulting in new PRT values.

An augmentation neural network 508 may be configured to receive and augment final combined time domain signals from the series of PRT neural networks 502a, 502b and signal summers 504a, 504b. A feature map generator 510 may receive the final combined time domain signals ($x_n$) and generate feature maps 516 of the final combined time domain signals, such as two real number feature maps or one complex number feature map, and feature maps 518 of a function of the final combined time domain signals, such as two real number feature maps or one complex number feature map of the function $x_n|x_n|^2$. The feature maps 516, 518 may be input to a first neural network layer 512a of the augmentation neural network 508, such as a 1-dimensional convolutional neural network layer having a 3-channel kernel. The output of the first neural network layer 512a may be input to a second neural network layer 514a, such as a residual neural network (ResNet) block having a 3-channel kernel. The output of the second neural network layer 514a may be input to a third neural network layer 514b, such as a ResNet block having a 3-channel kernel. The output of the third neural network layer 514b may be input to a fourth neural network layer 514c, such as a ResNet block having a 3-channel kernel. The output of the fourth neural network layer 514c may be input to a fifth neural network layer 512b, such as a 1-dimensional convolutional neural network layer having a 1-channel kernel. The output of the fifth neural network layer 512b may be combined with the final combined time domain signals by a signal summer 520 generating the time domain transmission waveform to be transmitted to a receiver. In some embodiments, the neural network layers 512a, 512b, 514a, 514b, 514c of the augmentation neural network 508 may be configured to implement circular convolution.

The receiver may receive a transmission waveform in the time domain and may use the receiver neural network 604 to demodulate the transmission waveform to generate a reconstruction of the time domain data signals. The receiver neural network 604 may receive the transmission waveform in the time domain and demodulate the transmission waveform to generate a reconstruction of the time domain data signals. In some embodiments, the receiver may use a receiver neural network 604 that is preconfigured on the receiver. In some embodiments, the receiver may use a receiver neural network 604 selected in response to receiving an indicator of the configuration of the receiver neural network 604. A fast Fourier transform component 602 of the receiver may convert the reconstruction of the time domain data signals from the reconstruction of the time domain data signals to a reconstruction of the frequency domain data tones.

To demodulate the transmission waveform to generate a reconstruction of the time domain data signals by the receiver neural network 604, a channel equalizer component 610 equalize the transmission waveform. The channel equalizer component 610 may apply any known equalization process. The equalization of the transmission waveform may undo the effect of the propagation channel on the frequency response of the transmission waveform. The channel equalizer component 610 may generate various signals from the equalized transmission waveform, including: an equalized time domain signal 624, 628 ($y_n$); feature maps of the equalized time domain signal 620, such as two real number feature maps or one complex number feature maps; and feature maps of a function of the equalized time domain signal 622, such as two real number feature maps or one complex number feature map of the function $y_n|y_n|^2$. A time domain PRT extractor component 612 may receive the equalized time domain signal 624, extract the time domain PRTs ($p_n$), and generate feature maps of the time domain PRTs 626 from the equalized time domain signal 624, such as two real number feature maps or one complex number feature map. A first neural network layer 614a (e.g., a 1-dimensional convolutional neural network layer having a 3-channel kernel) may receive the feature maps of the equalized time domain signal 620, the feature maps of the function of the equalized time domain signal 622, and the time domain PRTs 626 as inputs. The output of the first neural network layer 614a may be input to a second neural network layer 616a (e.g., a residual neural network (ResNet) block having a 3-channel kernel). The output of the second neural network layer 616a may be input to a third neural network layer 616b (e.g., a ResNet block having a 3-channel kernel). The output of the third neural network layer 616b may be input to a fourth neural network layer 614b (e.g., a 1-dimensional convolutional neural network layer having a 1-channel kernel). The output of the fourth neural network layer 614b may be combined with the equalized time domain signal 628 by a signal summer 618 generating the reconstruction of the time domain data signals to be input to the fast Fourier transform component 602 for generating the reconstruction of the frequency domain data tones.

For a set of PRT neural networks 502a, 502b, the augmentation neural network 508, and a receiver neural network 604 trained together, the means used to generate the time domain PRTs by the set of PRT neural network 502a, 502b and the augmentation neural network 508 to combine with the time domain data signals may be known to the receiver implementing the receiver neural network 604. As such, the time domain PRTs may contain information for demodulating the transmission waveform that a trained receiver neural network 604 can use to generate a reconstruction of the frequency domain data tones. The information contained in the time domain PRTs may enable a receiver using a trained receiver neural network 604 to improve demodulation performance, such as improving accuracy of a reconstruction of the frequency domain data tones compared to sending the transmission waveforms with PRTs generated by a traditional signal processing algorithm and demodulating using conventional demodulation circuitry.

Figure 7:
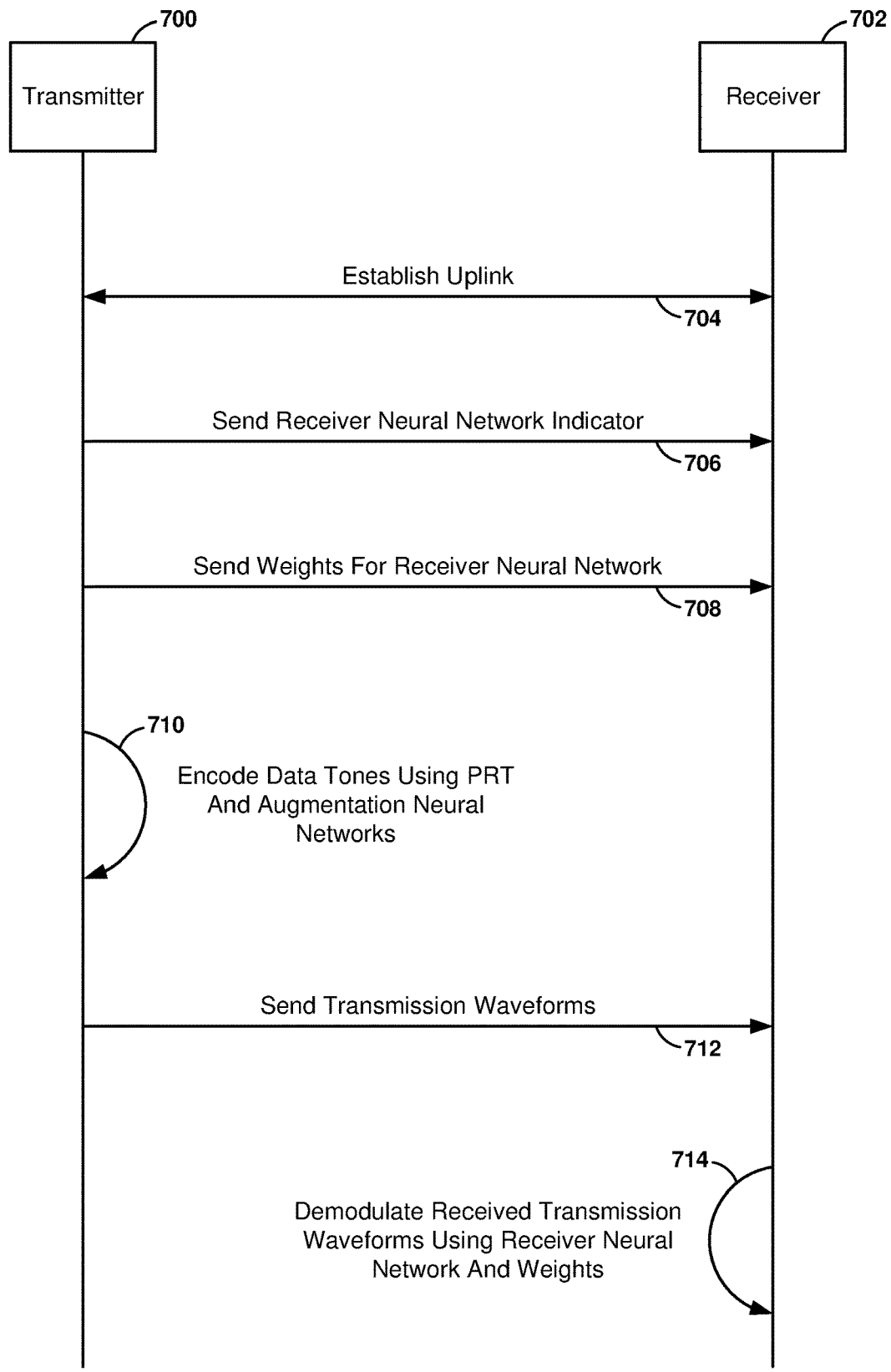
FIG. 7 is a component signaling diagram illustrating an example of a system configured to implement machine learning based encoding and decoding for nonlinearity mitigation using PRTs and neural augmentation in accordance with various embodiments.

FIG. 7 illustrates an example of a system configured to implement machine learning based encoding and decoding for nonlinearity mitigation using PRTs in accordance with various embodiments. With reference to FIGS. 1-7, a transmitter 700 (e.g., wireless device 120a-120e, 200, 320, 404) may indicate to a receiver 702 (e.g., base station 110a-110d, 350, 402) a receiver neural network (e.g., receiver neural network 604) to use to decode a transmission waveform to generate a reconstruction of time domain data signals for use in generating a reconstruction of frequency domain data tones.

The transmitter 700 and the receiver 702 may establish an uplink 704. The transmitter 700 may send a receiver neural network indicator 706 to the receiver 702. The receiver neural network indicator may be configured to indicate to the receiver 702 a receiver neural network to select from multiple receiver neural networks to decode a transmission waveform from the transmitter 700. In some embodiments, the receiver neural network indicator may be a reference, such as a flag bit in a signal, a content of a value in the signal, a quality of the signal, etc. configured to indicate to the receiver 702 the receiver neural network to select. In some embodiments, the receiver neural network indicator may be an indicator of the receiver neural network to select. In some embodiments, the receiver neural network indicator may be an indicator of a set of PRT neural networks (e.g., PRT neural networks 502a, 502b) and an augmentation neural network (e.g., augmentation neural network 508), which the transmitter 700 is configured with to generate a transmission waveform, from which the receiver 702 may determine the receiver neural network to select. In some embodiments, the receiver neural network indicator may be weights for use with the receiver neural network from which the receiver 702 may determine the receiver neural network to select. In some embodiments, the receiver 702 may use the receiver neural network indicator as a value for a hash function, look up table, data structure location, etc. for selecting the receiver neural network.

In some embodiments, the transmitter may be configured to select from a group of neural network implementations based on whether the transmitter is able to implement an augmentation neural network and/or a receiver neural network. Based on whether the transmitter is able to implement an augmentation neural network and/or a receiver neural network, the transmitter may select a neural network implementation and transmit the weights corresponding to the neural networks selected for implementation in an uplink control information to the receiver. Which neural network implementation the transmitter selects may depend on which neural network implementation the transmitter determines is best for a modulation and coding scheme. In some embodiments, in response to determining that the transmitter will implement an augmentation neural network and a receiver neural network, the neural network implementations may include using a set of PRT neural networks and any combination of using the augmentation neural network and/or a receiver neural network. In some embodiments, in response to determining that the transmitter will implement an augmentation neural network but not a receiver neural network, the neural network implementations may include using a set of PRT neural networks and either using or not using the augmentation neural network.

The transmitter 700 may send weights for the receiver neural network 708 to the receiver 702. The weights may be the weights for the receiver 702 to use in implementing the selected receiver neural network for demodulating the transmission waveform to generate a reconstruction of time domain data signals for use in generating a reconstruction of the frequency domain data tones. In some embodiments, the weights may be the receiver neural network indicator, and sending the weights for the receiver neural network 708 may be combined with sending the receiver neural network indicator 706.

The transmitter 700 may encode the time domain data signals, derived from frequency domain data tones, with time domain PRTs using the set of PRT neural networks and the augmentation neural network 710. An inverse fast Fourier transform component (e.g., inverse fast Fourier transform component 506) may receive the frequency domain data tones and convert the frequency domain data tones to time domain data signals. The set of PRT neural networks and the augmentation neural network of the transmitter 700 used to encode the time domain data signals may be the set of PRT neural networks and the augmentation neural network trained in conjunction with the receiver neural network. The set of PRT neural networks and the augmentation neural network may receive the time domain data signals and generate PRTs, based on the training of the set of PRT neural networks, the augmentation neural network, and the receiver neural network, which may result in the receiver neural network accurately generating a reconstruction of the frequency domain data signals. A signal summer (e.g., signal summer 504a, 504b) may receive and combine the time domain data signals and the PRTs. A signal summer (e.g., signal summer 520) may receive and combine final combined time domain signals and an output of the augmentation neural network, generating a transmission waveform. The transmitter 700 may send the transmission waveform in the time domain 712 to the receiver 702.

The receiver 702 may receive the transmission waveform and decode the transmission waveform using the receiver neural network and the weights 714. The receiver neural network used to demodulate the transmission waveform may be a receiver neural network selected based on the indicator received from the transmitter 700. The weights the receiver 702 may use with the receiver neural network may be the weights received from the transmitter 700. The receiver neural network may receive the transmission waveform in the time domain and use the received weights to demodulate the transmission waveform. Demodulating the transmission waveform may generate a reconstruction of the time domain data signals. A fast Fourier transform component (e.g., fast Fourier transfer component 602) may receive the reconstruction of the data signals in the time domain and convert the reconstruction of the time domain data signals to a reconstruction frequency domain data tones.

Figure 8:
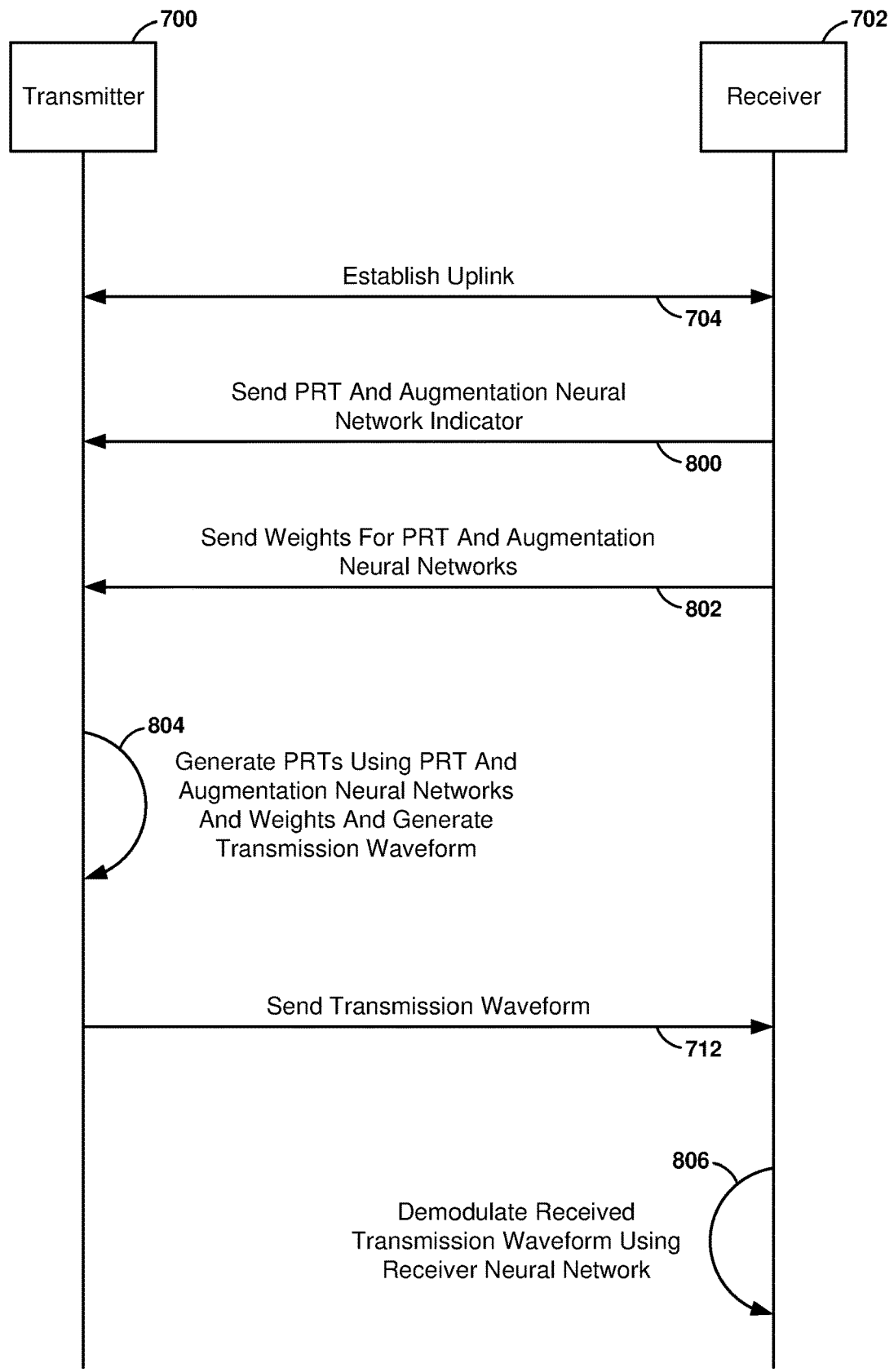
FIG. 8 is a component signaling diagram illustrating an example of a system configured to implement machine learning based encoding and decoding for nonlinearity mitigation using PRTs and neural augmentation in accordance with various embodiments.

FIG. 8 illustrates an example of a system configured to implement machine learning based encoding and decoding for nonlinearity mitigation using PRTs in accordance with various embodiments. With reference to FIGS. 1-8, a receiver 702 (e.g., base station 110a-110d, 350, 402) may indicate to a transmitter 700 (e.g., wireless device 120a-120e, 200, 320, 404) a set of PRT neural networks (e.g., PRT neural network 502a, 502b) and an augmentation neural network (e.g., augmentation neural network 508) to use to encode time domain data signals, derived from frequency domain data tones, with time domain PRTs to generate a transmission waveform.

The transmitter 700 and the receiver 702 may establish an uplink 704. The receiver 702 may send a PRT neural network indicator 800 to the transmitter 700. The PRT neural network indicator may be configured to indicate to the transmitter 700 a set of PRT neural networks and the augmentation neural network to select from multiple PRT neural networks to encode time domain data signals, derived from frequency domain data tones, with time domain PRTs by the transmitter 700. In some embodiments, the PRT neural network indicator may be a reference, such as a flag bit in a signal, a content of a value in the signal, a quality of the signal, etc. configured to indicate to the transmitter 700 the set of PRT neural networks and the augmentation neural network to select. In some embodiments, the PRT neural network indicator may be an indicator of the set of PRT neural networks and the augmentation neural network to select. In some embodiments, the PRT neural network indicator may be an indicator of a receiver neural network (e.g., receiver neural network 604), which the receiver 702 is configured with to decode a transmission waveform, from which the transmitter 700 may determine the PRT neural network to select. In some embodiments, the PRT neural network indicator may be weights for use with the set of PRT neural networks and the augmentation neural network from which the transmitter 700 may determine the set of PRT neural networks and the augmentation neural network to select. In some embodiments, the transmitter 700 may use the PRT neural network indicator as a value for a hash function, look up table, data structure location, etc. for selecting the set of PRT neural networks and the augmentation neural network.

The receiver 702 may send weights for the set of PRT neural networks and the augmentation neural network 802 to the transmitter 700. The weights may be the weights for the transmitter 700 to use in implementing the selected set of PRT neural networks and augmentation neural network for generating PRTs to generate a transmission waveform. In some embodiments, the weights may be the PRT neural network indicator, and sending the weights for the set of PRT neural networks and the augmentation neural network 802 may be combined with sending the PRT neural network indicator 800.

The transmitter 700 may encode the time domain data signals, derived from the frequency domain data tones, with time domain PRTs using the set of PRT neural networks, the augmentation neural network, and the weights 804. An inverse fast Fourier transform component (e.g., inverse fast Fourier transform component 506) may receive the data tones in the frequency domain and convert the data tones to the time domain data signals. The set of PRT neural networks and the augmentation neural network the transmitter 700 may use to encode the time domain data signals, derived from the frequency domain data tones, with the time domain PRTs may be a set of PRT neural networks and the augmentation neural network selected based on the indicator received from the receiver 702. The weights the transmitter 700 may use with the set of PRT neural networks and the augmentation neural network to encode the time domain data signals, derived from the frequency domain data tones, with the time domain PRTs may be the weights received from the receiver 702. The set of PRT neural networks and the augmentation neural network may receive the time domain data signals, derived from the frequency domain data tones, and use the received weights to generate time domain PRTs, based on the training of the set of PRT neural networks, the augmentation neural network, and the receiver neural network, which may result in the receiver neural network accurately generating a reconstruction of the time domain data signals, which may be used to reconstruct the frequency domain data tones. A signal summer (e.g., signal summer 504a, 504b) may receive and combine the time domain data signals and the time domain PRTs. A signal summer (e.g., signal summer 520) may receive and combine final combined time domain signals and an output of the augmentation neural network, generating a transmission waveform. The transmitter 700 may send the transmission waveform in the time domain 712 to the receiver 702.

The receiver 702 may receive the transmission waveform and decode the transmission waveform using the receiver neural network 806. The receiver neural network the receiver 702 may be used to decode the transmission waveform and may be the receiver neural network trained in conjunction with the set of PRT neural networks and the augmentation neural network. The receiver neural network may receive the transmission waveform in the time domain and demodulate the transmission waveform to generate a reconstruction of the time domain data signals. As part of the demodulating the received transmission waveform, the receiver neural network extracts the time domain PRTs to obtain the time domain data signals, but also uses information that is inherent in the way the PRTs were generated by the set of PRT neural networks and the augmentation neural network to improve the accuracy of the reconstructed time domain data signals. A fast Fourier transform component (e.g., fast Fourier transfer component 602) may receive the reconstructed time domain data signals and convert the reconstructed time domain data signals to reconstructed frequency domain data tones.

Figure 9:
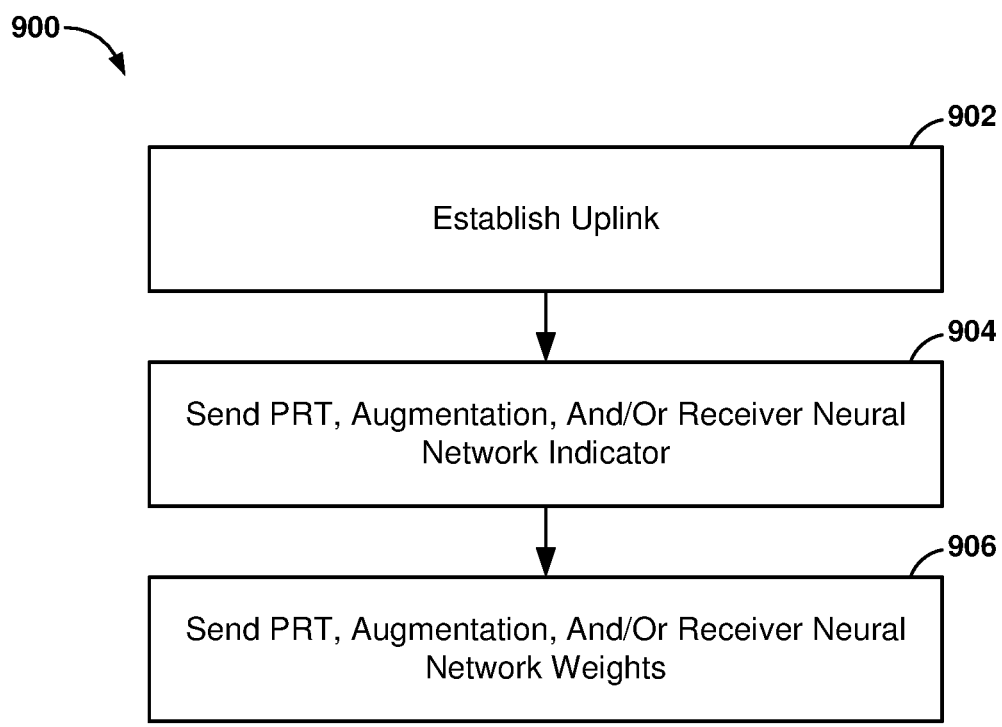
FIG. 9 is a process flow diagram illustrating an example of a method for transmitting machine learning based data for nonlinearity mitigation using PRTs and neural augmentation in accordance with various embodiments.

FIG. 9 illustrates of a method for transmitting machine learning based data for nonlinearity mitigation using PRTs in accordance with various embodiments. With reference to FIGS. 1-9, the method 900 may be implemented in a computing device (e.g., base station 110a-110d, 350, 402, wireless device 120a-120e, 200, 320, 404, transmitter 700, receiver 702), in general purpose hardware, in dedicated hardware, in software executing in a processor (e.g., processor 210, 212, 214, 216, 218, 252, 256, 260, 428, 432), or in a combination of a software-configured processor and dedicated hardware, such as a processor executing software within an peak reduction encoder and/or decoder system (e.g., processor 210, 212, 214, 216, 218, 252, 256, 260, 428, 432, encoder 500, decoder 600) that includes other individual components, and various memory/cache controllers. In order to encompass the alternative configurations enabled in various embodiments, the hardware implementing the method 900 is referred to herein as a "wireless communication device."

In block 902, the wireless communication device may establish an uplink with another wireless communication device. Establishing the uplink may be initiated by the wireless communication device and established based on communication signals and data transmitted between the wireless communication devices. The uplink may be established via various know means, including means for establishing an up link in a 5G NR network. In some embodiments, establishing the uplink in block 902 may occur between a transmitter and a receiver. In some embodiments, establishing the uplink in block 902 may occur between a wireless device and a base station.

In block 904, the wireless communication device may send a set of PRT neural networks, an augmentation neural network, and/or a receiver neural network. The receiver neural network may be a receiver neural network trained in conjunction with a set of PRT neural networks and the augmentation neural network used by the wireless communication device. In some embodiments, the transmitter and/or the wireless device may send the receiver neural network in block 904.

In some embodiments, sending the set of PRT neural networks and the augmentation neural network in block 904 may be implemented by sending an indicator of the set of PRT neural networks and the augmentation neural network configured to indicate to the other wireless communication device which set of PRT neural networks (e.g., PRT neural networks 502a, 502b) and augmentation neural networks (e.g., augmentation neural network 508) to choose from among multiple sets of PRT neural networks preconfigured on the other wireless communication device. In some embodiments, sending the receiver neural network may be implemented by sending an indicator of the receiver neural network (e.g., receiver neural network 604) configured to indicate to the other wireless communication device which receiver neural network to choose from among multiple receiver neural networks preconfigured on the other wireless communication device. In some embodiments, the indicator may be a reference, such as a flag bit in a signal, a content of a value in the signal, a quality of the signal, etc. configured to indicate to the other wireless communication device the set of PRT neural networks, the augmentation neural network, and/or the receiver neural network to select. In some embodiments, the indicator may be an indicator of the set of PRT neural networks, the augmentation neural network, and/or the receiver neural network to select. In some embodiments, the indicator may be an indicator of a set of PRT neural networks and the augmentation neural network, which the transmitting wireless communication device is configured with to generate a transmission waveform, from which the receiving wireless communication device may determine the receiver neural network to select. In some embodiments, the indicator may be an indicator of a receiver neural network, which the receiving wireless communication device is configured with to decode a transmission waveform, from which the transmitting wireless communication device may determine the set of PRT neural networks and the augmentation neural network to use to generate time domain PRTs. In some embodiments, the indicator may be weights for use with the set of PRT neural networks, the augmentation neural network, and/or the receiver neural network from which the other wireless communication device may determine the set of PRT neural networks, the augmentation neural network, and/or the receiver neural network to select. In some embodiments, the other wireless communication device may use the indicator as a value for a hash function, look up table, data structure location, etc. for selecting the set of PRT neural networks, the augmentation neural network, and/or the receiver neural network.

In some embodiments, the wireless communication device may send the set of PRT neural networks and the augmentation neural network to the other wireless communication device. The set of PRT neural networks and the augmentation neural network may be a set of PRT neural networks and the augmentation neural network trained in conjunction with a receiver neural network used by the wireless communication device. In some embodiments, the receiver and/or the base station may send the set of PRT neural networks and the augmentation neural network in block 904. In some embodiments, the wireless communication device may send the receiver neural network to the other wireless communication device.

In block 906, the wireless communication device may send the set of PRT neural networks, the augmentation neural network, and/or receiver neural network weights. The wireless communication device may send the weights to the other wireless communication device. The weights may be the weights for the transmitting wireless communication device to use in implementing the selected set of PRT neural networks and the augmentation neural network for generating time domain PRTs to generate a transmission waveform. In some embodiments, the weights may be the PRT neural network indicator, and sending the weights for the set of PRT neural networks and the augmentation neural network in block 906 may be combined with sending the PRT neural network indicator in block 904. In some embodiments, the weights may be the weights for the receiving wireless communication device to use in implementing the selected receiver neural network for demodulating the transmission waveform to generate a reconstruction of the frequency domain data tones. In some embodiments, the weights may be the receiver neural network indicator, and sending the weights for the receiver neural network in block 906 may be combined with sending the receiver neural network indicator in block 904. In some embodiments, the wireless communication device may send the PRT neural network to the other wireless communication device. In some embodiments, the receiver and/or the base station may send the PRT neural network weights in block 906. In some embodiments, the transmitter and/or the wireless device may send the receiver neural network weights in block 906.

In some embodiments, the method 900 may be implemented for each uplink established between a mobile wireless communication device and a base station wireless communication device. In some embodiments, the method 900 may be repeatedly implemented for each interval of a certain number of uplinks established between the wireless communication device and the base station wireless communication device. In some embodiments, the method 900 may be repeatedly implemented for uplinks established between the wireless communication device and the base station wireless communication device following a designated period of time.

Figure 10A:
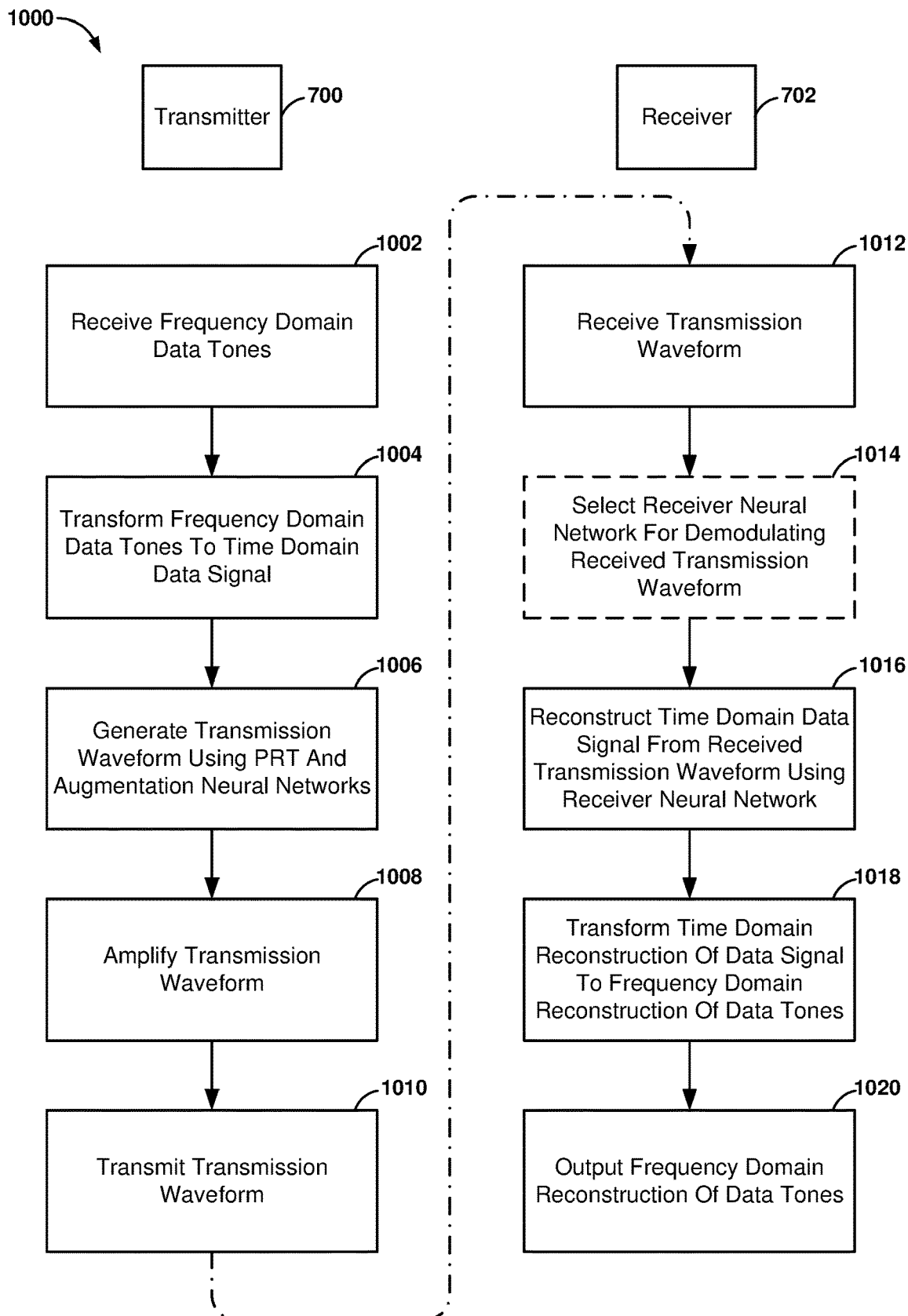
FIGS. 10A and 10B are process flow diagrams illustrating example methods for implementing machine learning based encoding and decoding for nonlinearity mitigation using PRTs and processing of an augmentation neural network in accordance with various embodiments.

FIG. 10A illustrates an example of an end-to-end method 1000 for encoding frequency domain data tones into a waveform transmitted by transmitter and recovering the frequency domain data tones in a receiver machine learning based encoding and decoding for nonlinearity mitigation using PRTs in accordance with various embodiments. With reference to FIGS. 1-10A, the method 1000 may be implemented in a computing device (e.g., base station 110a-110d, 350, 402, wireless device 120a-120e, 200, 320, 404, transmitter 700, receiver 702), in general purpose hardware, in dedicated hardware, in software executing in a processor (e.g., processor 210, 212, 214, 216, 218, 252, 256, 260, 428, 432), or in a combination of a software-configured processor and dedicated hardware, such as a processor executing software within an peak reduction encoder and/or decoder system (e.g., processor 210, 212, 214, 216, 218, 252, 256, 260, 428, 432, encoder 500, decoder 600) that includes other individual components, and various memory/cache controllers. In order to encompass the alternative configurations enabled in various embodiments, the hardware implementing the method 1000 is referred to herein as a "wireless communication device."

In block 1002, a transmitter, a transmitter wireless communication device, an encoder, and/or an inverse fast Fourier transform component (e.g., inverse fast Fourier transform component 506) of the transmitter wireless communication device may receive the frequency domain data tones in block 1002. The data tones may be a stream of data, such as a data packet, that has been mapped to a sequence of modulation symbols, such as quadrature amplitude modulation (QAM) symbols (e.g. 16QAM symbols).

In block 1004, the transmitter, the transmitter wireless communication device, the encoder, and/or the inverse fast Fourier transform component of the transmitter wireless communication device may transform the frequency domain data tones to time domain data signals for generating a transmission waveform for amplification and transmission.

Figure 12:
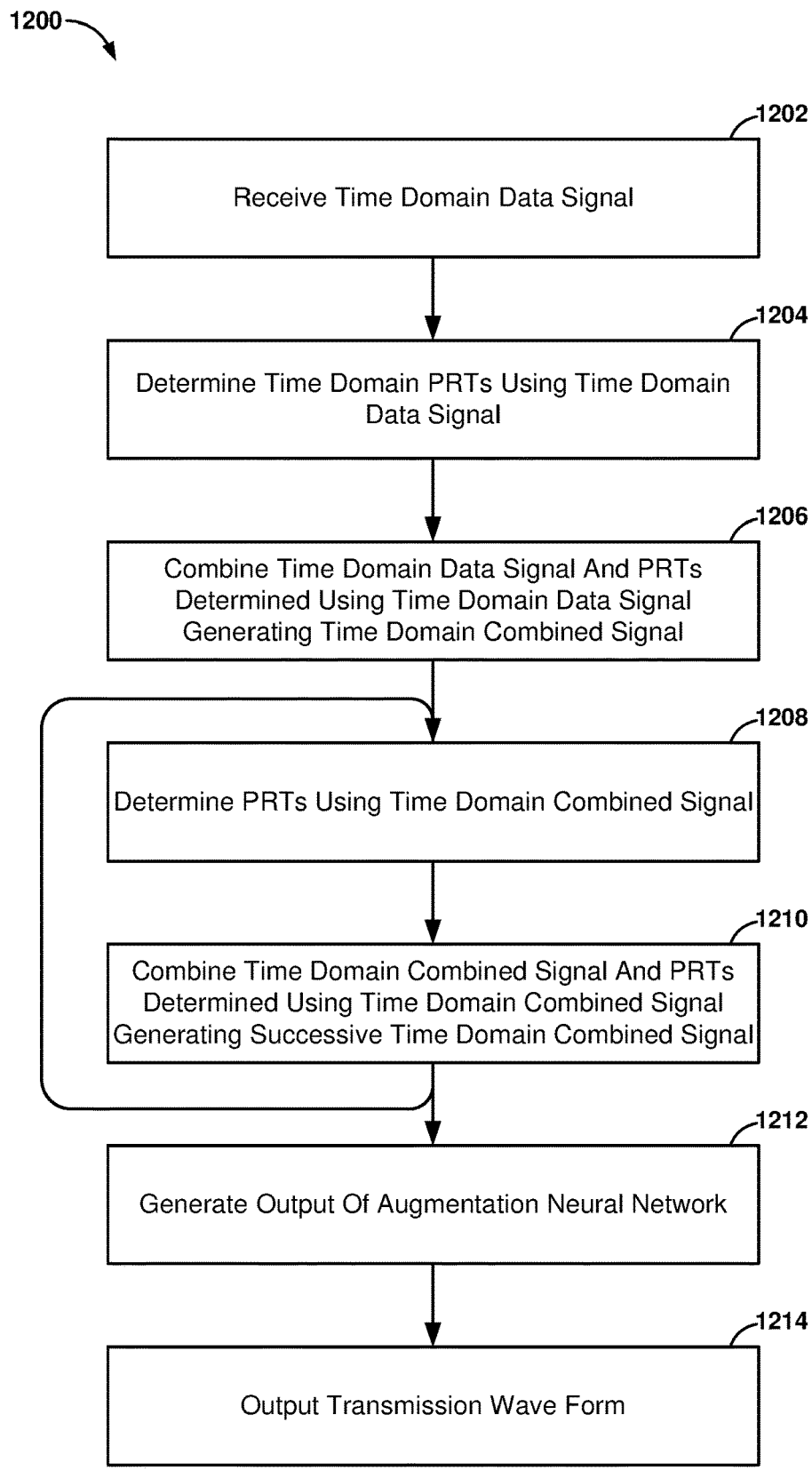
FIG. 12 is a process flow diagram illustrating an example of a method for generating a transmission waveform from data tones using neural networks in accordance with various embodiments.

In block 1006, the transmitter, the transmitter wireless communication device, and/or the encoder may generate the transmission waveform using a set of PRT neural networks (e.g., a set of PRT neural networks 502a, 502b) and an augmentation neural network (e.g., augmentation neural network 508) of the wireless communication device as described further herein in the method 1200 with reference to FIG. 12. The transmitter wireless communication device may process the transformed time domain data signals in block 1004 through a trained set of PRT neural networks and the augmentation neural network to generate a transmission waveform. As described herein the set of PRT neural networks and the augmentation neural network in the transmitter may be trained based on accuracy of reconstruction of the frequency domain data tones by a trained receiver neural network (e.g., receiver neural network 604). The set of PRT neural networks and the augmentation neural network may be trained to reduce PAPR in the signal for transmission by the transmitting wireless communication device. By generating PRTs for the frequency domains data signals via the set of PRT neural networks and the augmentation neural network, and including the PRTs in the transmission waveform, the transmission waveform may include information inherent within the PRTs that may aid in recovering the time domain data signal more accurately by the receiver neural network than may be possible using conventional demodulating circuits.

In block 1008, the transmitter, the transmitter wireless communication device, a power amplifier (e.g., resources 224 of a first SOC 202 including power amplifiers) of the transmitter wireless communication device may amplify the transmission waveform. Amplification of the transmission waveform may amplify a transmission power of the transmission waveform.

In block 1010, the transmitter of the transmitter wireless communication device may transmit the transmission waveform to another wireless communication device. In some embodiments, the wireless communication device may transmit the transmission waveform to wireless communication devices via a 5G NR network.

In block 1012, the antenna of a receiver wireless communication device may receive the transmission waveform from the transmitting wireless communication device.

In optional block 1014, the receiving wireless communication device may select a receiver neural network (e.g., receiver neural network 604) for demodulating wireless signals received from the transmitter wireless communication device. The operations in block 1014 are optional, because in some embodiments, the receiver neural network may not change. Also, the operations in optional block 1014 may be performed prior to receiving the transmission waveform, such as during processes for establishing a wireless communication link with the transmitter. In some embodiments, the receiver wireless communication device may have already received and/or may receive, as part of the transmission of the transmitter wireless communication device, a receiver neural network indicator, as described herein in block 904 of the method 900 (FIG. 9). In some embodiments, the receiving wireless communication device may use the receiver neural network indicator as a value for a hash function, look up table, data structure location, etc. for selecting the receiver neural network. In some embodiments, the receiving wireless communication device may be communicative linked to multiple wireless communication devices, and may us metadata of the transmission waveform identifying the wireless communication device to associate the receiver neural network indicator from the wireless communication device with the transmission waveform. In some embodiments, the receiver, the base station, the decoder, and/or a receiver neural network may select a receiver neural network for demodulating the transmission waveform in optional block 1014.

Figure 13:
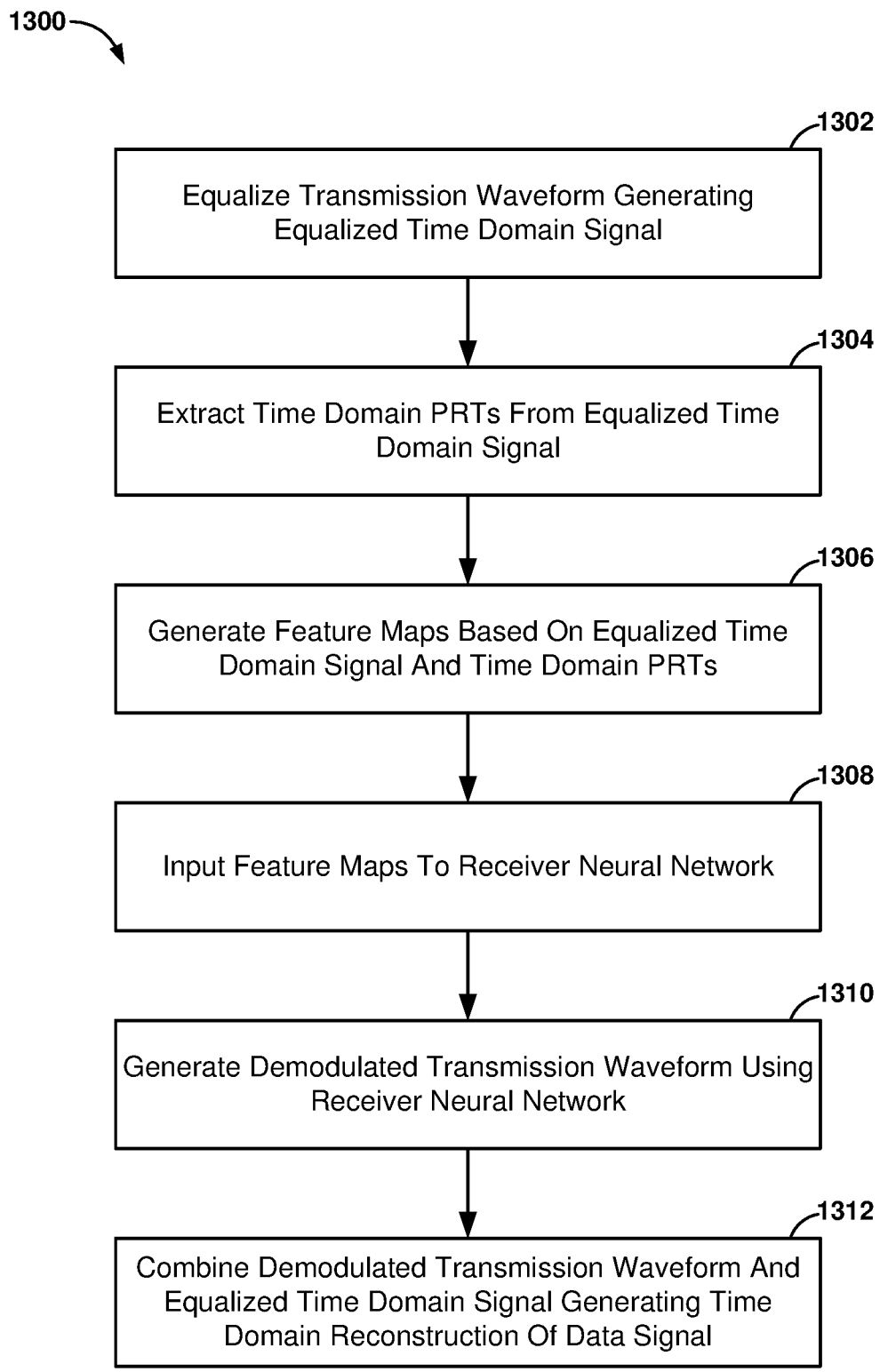
FIG. 13 is a process flow diagram illustrating an example of a method for reconstructing time domain data signal from a transmission waveform using neural networks in accordance with various embodiments.

In block 1016, a receiver, the receiving wireless communication device, and/or a decoder may reconstruct the time domain data signals from the received transmission waveform using a receiver neural network of the wireless communication device as described in the method 1300 with reference to FIG. 13. In some embodiments, the receiver neural network may be the receiver neural network selected in optional block 1014. The receiver wireless communication device may process the received time domain transmission waveform in block 1012 through a trained receiver neural network to generate a reconstruction of the time domain data signals. As described herein the receiver neural network in the receiver may be trained based on outputs from the transmitter that includes a set of PRT neural networks (i.e., the set of PRT neural networks used on block 1006) and the augmentation neural network trained to reduce PAPR in the signal for transmission by the transmitting wireless communication device. The receiver neural network in the receiver wireless communication device may be configured to demodulate the time domain transmission waveform to reconstruct the time domain data signals. By being trained based on outputs from the transmitter that includes the set of PRT neural networks and the augmentation neural network, the receiver neural network is able to use information inherent within the PRTs to recover the time domain data signal more accurately than may be possible using conventional demodulating circuits.

In block 1018, a fast Fourier transform component (e.g., 602) of the receiver wireless communication device may transform the reconstruction of the time domain data signals to the frequency domain, generating a reconstruction of the frequency domain data tones that are output in block 1020.

Figure 10B:
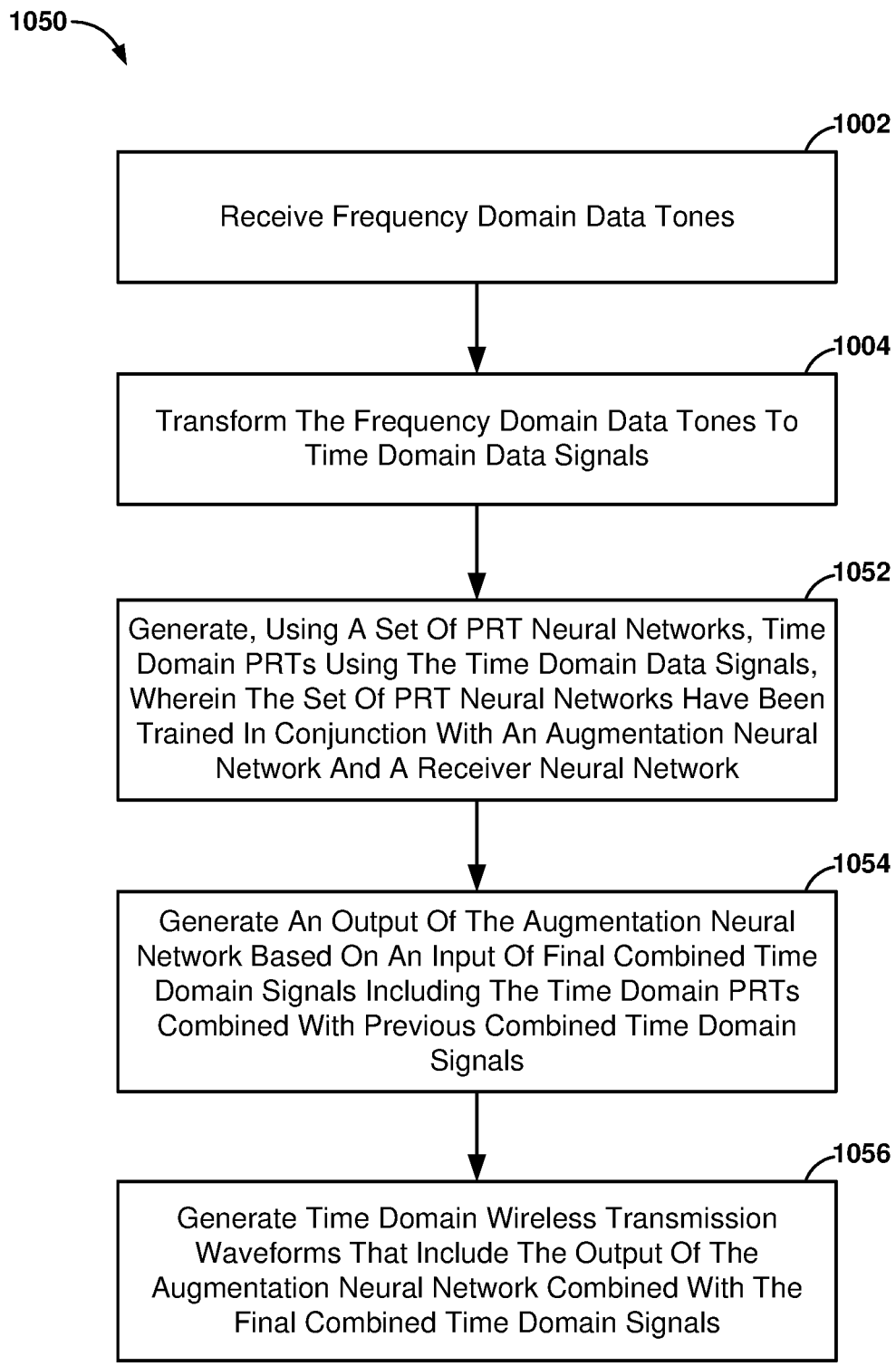

FIG. 10B illustrates an example method 1050 that may be performed by a transmitter wireless communication device for encoding frequency domain data tones into a transmission waveform using machine learning based encoding for nonlinearity mitigation using PRTs in combination with an augmentation neural network in accordance with various embodiments. With reference to FIGS. 1-10B, the method 1050 may be implemented in a various components of a wireless communication device (e.g., base station 110a-110d, 350, 402, wireless device 120a-120e, 200, 320, 404, transmitter 700). In order to encompass the alternative configurations enabled in various embodiments, the hardware implementing the method 1050 is referred to generally as a "transmitter wireless communication device."

In block 1002, the wireless communication device may receive frequency domain tones for transmission as described for the like numbered block of the method 1000. In block 1004, the transmitter wireless communication device may transform the frequency domain data tones to time domain data signals as described for the like numbered block of the method 1000.

In block 1052, the transmitter wireless communication device may generate, using a set of PRT neural networks (e.g., 502a, 502b, etc.), time domain PRTs using the time domain data signals, in which the set of PRT neural networks (e.g., 502a, 502b, etc.) have been trained in conjunction with the augmentation neural network and the receiver neural network (e.g., 604) as described herein.

In block 1054, the transmitter wireless communication device may generate an output of the augmentation neural network based on an input of final combined time domain signals including the time domain PRTs combined with previous combined time domain signals. Some embodiments may further include the transmitter wireless communication device generating real number feature maps of the final combined time domain signals and real number feature maps of a function of the final combined time domain signals, and in such embodiments the transmitter wireless communication device may generate the output of the augmentation neural network based on an input of real number feature maps of the final combined time domain signals and the real number feature maps of the function of the final combined time domain signals. Some embodiments may further include the transmitter wireless communication device generating complex number feature maps of the final combined time domain signals and complex number feature maps of a function of the final combined time domain signals, and in such embodiments the transmitter wireless communication device may generate the output of the augmentation neural network based on the input of the complex number feature maps of the final combined time domain signals and the complex number feature maps of the function of the final combined time domain signals.

In block 1056, the transmitter wireless communication device may generate time domain wireless transmission waveforms that include the output of the augmentation neural network combined with the final combined time domain signals.

Figure 11:
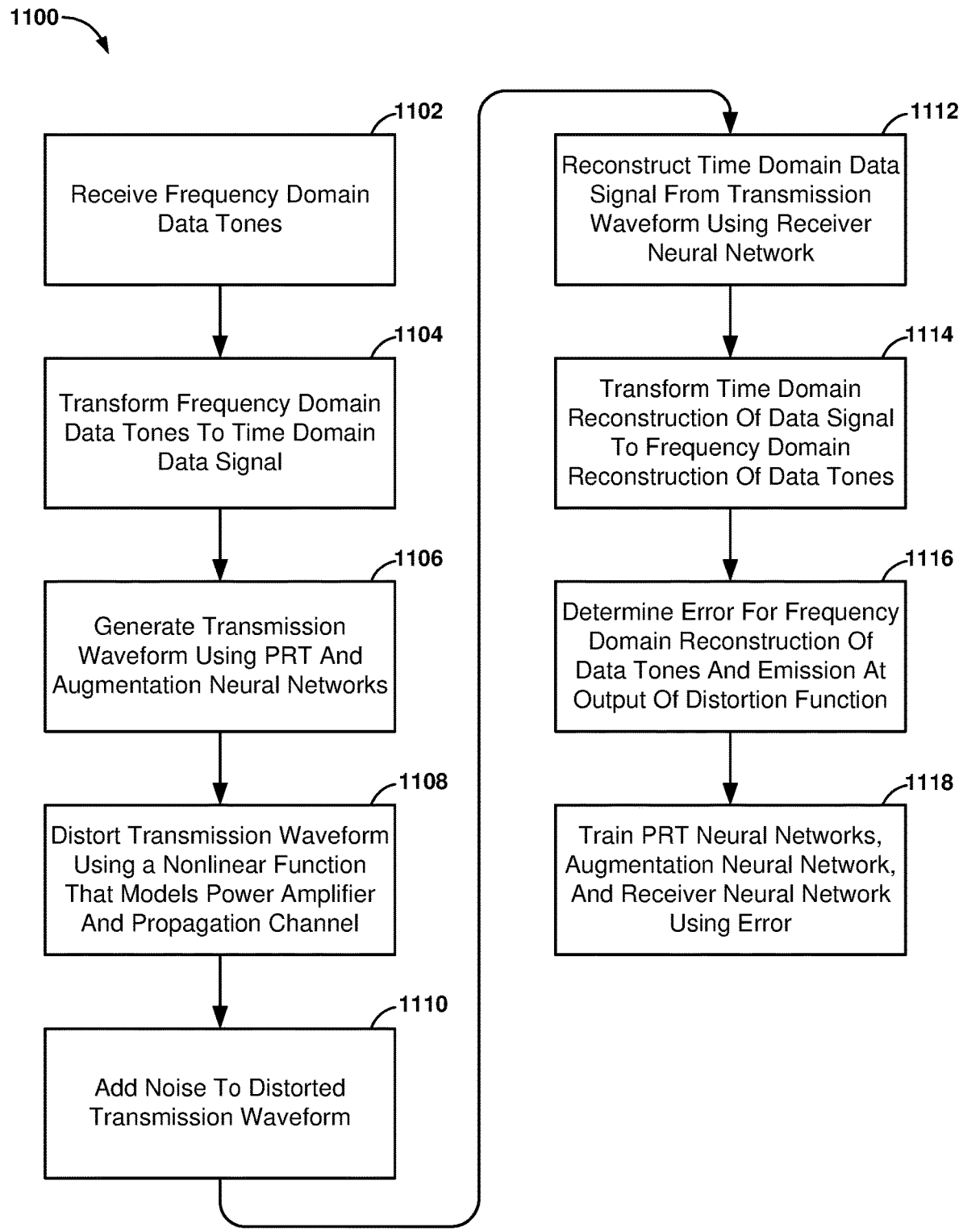
FIG. 11 is a process flow diagram illustrating an example of a method for training neural networks for generating time domain PRTs based on data tones on the transmitter side and reconstructing the data tones on the receiver in accordance with various embodiments.

FIG. 11 illustrates an example of method 1100 for training machine learning neural networks on the transmitter side for generating PRTs based on an input of data tones and for extracting the PRTs and reconstructing the data tones on the receiver side in accordance with various embodiments. With reference to FIGS. 1-11, the method 1100 may be implemented in a wireless communication device (e.g., base station 110a-110d, 350, 402, wireless device 120a-120e, 200, 320, 404, transmitter 700, receiver 702) having a neural network (e.g., 502, 602) in or coupled to a processor (e.g., processor 210, 212, 214, 216, 218, 252, 256, 260, 428, 432), or in a combination of a software-configured processor and dedicated hardware, such as a processor executing software within an peak reduction encoder and/or decoder system (e.g., processor 210, 212, 214, 216, 218, 252, 256, 260, 428, 432, encoder 500, decoder 600) that includes other individual components, and various memory/cache controllers. In order to encompass the alternative configurations enabled in various embodiments, the hardware implementing the method 1100 is referred to herein as a "training device."

In block 1102, the training device may receive frequency domain data tones representative of a data signal a transmitter may send to a receiver during a wireless communication. In some embodiments, an encoder and/or a set of PRT neural networks (e.g., set of PRT neural networks 502a, 502b) may receive the frequency domain data tones in block 1102. In some embodiments, the encoder, an inverse fast Fourier transform component (e.g., inverse fast Fourier transform component 506), and/or a processor may receive the frequency domain data tones in block 1102.

In block 1104, the training device may transform the frequency domain data tones to time domain data signals for generating a transmission waveform for amplification and transmission. In some embodiments, the encoder, the inverse fast Fourier transform component, and/or a processor may transform the frequency domain data tones to time domain data signals in block 1104.

In block 1106, the training device may generate the transmission waveform using a set of PRT neural networks (e.g., a set of PRT neural networks 502a, 502b) and an augmentation neural network (e.g., augmentation neural network 508) of the transmitter wireless communication device as described further herein in the method 1200 with reference to FIG. 12. The training device may process the transformed time domain data signals in block 1104 through a set of PRT neural networks and the augmentation neural network to generate a transmission waveform. As described herein the set of PRT neural networks and the augmentation neural network may be trained based on accuracy of reconstruction of the frequency domain data tones by a trained receiver neural network (e.g., receiver neural network 604) and/or on deviations from acceptable emissions of a distortion function applied to the transmission waveform. The set of PRT neural networks and the augmentation neural network may be trained to reduce PAPR in the signal for transmission by the transmitting wireless communication device. By generating PRTs for the frequency domains data signals via the set of PRT neural networks and the augmentation neural network, and including the PRTs in the transmission waveform, the transmission waveform may include information inherent within the PRTs that may aid in recovering the time domain data signal more accurately by the receiver neural network than may be possible using conventional demodulating circuits. In some embodiments, an encoder, a set of PRT neural networks, an augmentation neural network, signal summers (e.g., 504a, 504b, 520), and/or a processor may generate the transmission waveform in block 1116.

In block 1108, the training device may distort the transmission waveform using a nonlinear function that models a power amplifier and a propagation channel. The training device may distort the transmission waveform to mimic conditions of transmitting the transmission waveform from the transmitter wireless communication device to a receiver wireless communication device. Including these distortions during training of the set of PRT neural networks, the augmentation neural network, and the receiver neural network may train the neural networks to account for the effects of the distortions on the transmission waveform and on the reconstruction of the frequency domain data tones. Training with the distortions of the transmission waveform may make the neural networks more resistant to the effects of distortions of the transmission waveform when applied on the transmitter wireless communication device and the receiver wireless communication device. In some embodiments, a processor of the training device may be configured to distort the transmission waveform in block 1108.

In block 1110, the training device may add noise to the transmission waveform. The training device may add noise to the transmission waveform to mimic interference during transmission of transmission waveform from the transmitter wireless communication device to the receiver wireless communication device. Including the added noise during training of the set of PRT neural networks, the augmentation neural network, and the receiver neural network may train the neural networks to account for the effects of interference on the transmission waveform and on the reconstruction of the frequency domain data tones. Training with the added noise in the transmission waveform may make the neural networks more resistant to the effects of interference during transmission waveform when applied on the transmitter wireless communication device and the receiver wireless communication device. In some embodiments, a processor of the training device may be configured to add noise to the transmission waveform in block 1110.

In block 1112, the training device may reconstruct the time domain data signals from the transmission waveform using a receiver neural network as described in the method 1300 with reference to FIG. 13. The receiver wireless communication device may process the time domain transmission waveform in any combination of blocks 1106, 1108, 1110 through a receiver neural network to generate a reconstruction of the time domain data signals. As described herein, the receiver neural network in the receiver may be trained based on outputs from a set of PRT neural networks and the augmentation neural network (i.e., the set of PRT neural networks and the augmentation neural network used on block 1106) that are trained to reduce PAPR in the signal for transmission by the transmitting wireless communication device. The receiver neural network may be configured to demodulate the time domain transmission waveform to reconstruct the time domain data signals. By being trained based on outputs from the set of PRT neural networks and the augmentation neural network, the receiver neural network is able to use information inherent within the PRTs to recover the time domain data signal more accurately than may be possible using conventional demodulating circuits.

In block 1114, the training device may transform the reconstruction of the time domain data signals to the frequency domain, generating a reconstruction of the frequency domain data tones. In some embodiments, a decoder, a fast Fourier transform component (e.g., 602), and/or a processor may transform the reconstruction of the time domain data signals to the frequency domain in block 1114.

In block 1116, the training device may determine an error for the reconstruction of the frequency domain data tones and for emission at the distortion function used to distort the transmission waveform in block 1108. The training device may be configured to compare the frequency domain data tones and the reconstruction of the frequency domain data tones by various known means to determine an error value for the reconstruction of the data tones (error1). For example, the reconstruction of the frequency domain data tones and the frequency domain data tone qualities and/or contents may be compared. As a further example, a result of processing the reconstruction of the frequency domain data tones may indicate an error value for the reconstruction of the frequency domain data tones, and/or a comparison of the result to an expected result may indicate an error value for the reconstruction of the frequency domain data tones. In some embodiments, the training device may determine an error for the reconstruction of the frequency domain data tones from calculating the mean-squared error between the frequency domain data tones and the reconstruction of the frequency domain data tones. The training device may be configured to determine an error by a distortion function output based on an energy outside the allocated band (error2). In some embodiments, a total error may be obtained by a weighted average of the error from the comparison of a reconstruction of the frequency domain data tones to the frequency domain data tones (error1) and the error from the distortion function output (error2). For example, the total error may=error1+α*error2, for some "α" that may be found during hyper-parameter tuning. In some embodiments, the encoder, the decoder, and/or a processor may determine an error for the reconstruction of the data tones in block 1116.

In block 1118, the training device may train the set of PRT neural networks, the augmentation neural network, and the receiver neural network, in conjunction with each other, using the calculated error. The calculated error may include any of: the error from the comparison of a reconstruction of the frequency domain data tones to the frequency domain data tones; the error from the distortion function output; or a weighted average of the error from the comparison of a reconstruction of the frequency domain data tones to the frequency domain data tones and the error from the distortion function output. The training device may be configured to update weight values of the set of PRT neural networks and the augmentation neural network used to generate the time domain PRTs and/or weight values of the receiver neural network used to demodulate the transmission waveform to reconstruct the frequency domain data tones, as derived from the demodulated reconstruction of the time domain data signals, so as to reduce the error. The training device may use an algorithm configured to use the error value and weights as inputs and output updated weights. In some embodiments, the encoder, the decoder, and/or a processor may train the set of PRT neural networks, the augmentation neural network, and the receiver neural network using the error for the reconstruction of the frequency domain data tones in block 1118.

In some embodiments, the method 1100 may be repeated training the set of PRT neural networks, the augmentation neural network, and the receiver neural network in combination until a difference between the frequency domain data tones input to the transmitter with its PRT neural network and the frequency domain reconstructed data tones output by the receiver neural network falls within an acceptable error threshold. In some embodiments, the method 1100 may be repeated using multiple different frequency domain data tones for multiple iterations of the method 1100. The method 1100 may be repeated using the multiple frequency domain data tones until a number of the multiple frequency domain data tones, up to all of the multiple frequency domain data tones, result in error values that do not exceed the threshold of error. Successive iterations of the method 1100 may use updated weights resulting from training the set of PRT neural networks, the augmentation neural network, and/or the receiver neural network using the error values in block 1118.

Various embodiments improve the functioning of wireless communication device transmitters and receivers compared to conventional transmitter/receiver pairs. By training the receiver neural network based on the output of the transmitter that uses a trained PRT neural network to generate PRTs, the trained receiver neural network is able to make use of information related to the PRTs that is embedded within the transmission waveform output by the transmitter to reconstruct the data tones more accurately (i.e., with less error) than possible using conventional demodulation circuits that ignore the PRTs. By training the PRT neural network and receiver neural network in combination, a close connection between encoder and decoder may be coupled via the PRTs inserted into the transmitted signals, thereby both reducing the PAPR to within acceptable levels on the transmitter side while also enabling better reconstruction of the data tones on the receiver side than feasible using conventional PRT generation circuits and demodulation circuits.

FIG. 12 illustrates an example of a method for implementing generating a transmission waveform from data tones using neural networks in accordance with various embodiments. With reference to FIGS. 1-12, the method 1200 may be implemented in a computing device (e.g., base station 110*a*-110*d*, 350, 402, wireless device 120*a*-120*e*, 200, 320, 404, transmitter 700, receiver 702), in general purpose hardware, in dedicated hardware, in software executing in a processor (e.g., processor 210, 212, 214, 216, 218, 252, 256, 260, 428, 432), or in a combination of a software-configured processor and dedicated hardware, such as a processor executing software within an peak reduction encoder and/or decoder system (e.g., processor 210, 212, 214, 216, 218, 252, 256, 260, 428, 432, encoder 500, decoder 600) that includes other individual components, and various memory/cache controllers. In order to encompass the alternative configurations enabled in various embodiments, the hardware implementing the method 1200 is referred to herein as a "wireless communication device" and/or a "training device." In some embodiments, the method 1200 may further describe block 1006 of the method 1000 described herein with reference to FIG. 10 and block 1106 of the method 1100 described herein with reference to FIG. 11.

In block 1202, the wireless communication device and/or the training device may receive time domain data signals. The time domain data signals may be the time domain data signals transformed in block 1004 of the method 1000 as described with reference to FIG. 10 and/or block 1104 of the method 1100 as described with reference to FIG. 11. In some embodiments, a processor, an encoder, and/or a PRT neural network (e.g., a first PRT neural network 502*a*) may receive time domain data signals in block 1202.

In block 1204, the wireless communication device and/or the training device may determine time domain PRTs using time domain data signals. The time domain data signals may be the time domain data signals received in block 1202. In some embodiments a PRT neural network may receive the time domain data signals as inputs, process the time domain data signals with the weights of the PRT neural network, and generate time domain PRTs as an inference. In some embodiments, the PRT neural network may process the time domain data signals using traditional PRT calculation algorithms, where the PRT neural network computes one iteration of the traditional PRT calculation algorithm. In the traditional PRT calculation algorithm, each iteration has the same weight values. But, the iteration of the traditional PRT calculation algorithm used in each PRT neural network may have different weight values. Training of the PRT neural networks may determine the weight values that may be different for each of the PRT neural networks to generate time domain PRTs that result in more accurate reconstruction of the frequency domain data tones than when determined by the traditional PRT calculation algorithms, where each iteration uses the same weight values. In some embodiments, the processor, the encoder, and/or the PRT neural network (e.g., a first PRT neural network 502*a*) may determine time domain PRTs using time domain data signals in block 1204.

In block 1206, the wireless communication device and/or the training device may combine the time domain data signals and the time domain PRTs, generated using the time domain data signals, generating time domain combined signals. First time domain combined signals may be a result of a combination of the time domain data signals and the time domain PRTs generated by a PRT neural network, such as a first PRT neural network, using the time domain data signals as inputs. In some embodiments, the time domain data signals and the time domain PRTs may be summed together. In some embodiments, the processor, the encoder, and/or a signal summer (e.g., a first signal summer 504*a*) may combine the time domain data signals and the time domain PRTs, generating a time domain combined signals in block 1206.

In block 1208, the wireless communication device and/or the training device may determine time domain PRTs using the time domain combined signals. The time domain combined signals may be the first time domain combined signals generated in block 1206. In some embodiments, a PRT neural network may receive the time domain combined signals as inputs, process the time domain combined signals with the weights of the PRT neural network, and generate time domain PRTs as an inference. In some embodiments, the PRT neural network may process the time domain combined signals using traditional PRT calculation algorithms, where the PRT neural network computes one iteration of the traditional PRT calculation algorithm. In the traditional PRT calculation algorithm, each iteration has the same weight values. But, the iteration of the traditional PRT calculation algorithm used in each PRT neural network may have different weight values. Training of the PRT neural networks may determine the weight values that may be different for each PRT neural network to generate time domain PRTs that result in more accurate reconstruction of the frequency domain data tones than when determined by unmodified versions of the traditional PRT calculation algorithms, where each iteration uses the same weight values. In some embodiments, the processor, the encoder, and/or the PRT neural network (e.g., a second PRT neural network 502*b*, a third PRT neural network 502*b*) may determine time domain PRTs using time domain combined signals in block 1208.

In block 1210, the wireless communication device and/or the training device may combine the time domain combined signals and the time domain PRTs, generated using the time domain combined signals, generating successive time domain combined signals. Successive time domain combined signals may be a result of a combination of prior time domain combined signals, such as the first time domain combined signals, and the time domain PRTs generated by a PRT neural network, such as a second PRT neural network, using the prior time domain combined signals as inputs. In some embodiments, the prior time domain combined signals and the time domain PRTs may be summed together. In some embodiments, the processor, the encoder, and/or the signal summer (e.g., a second signal summer 504*b*) may combine the time domain data signals and the time domain PRTs, generating time domain combined signals in block 1210.

In some embodiments, blocks 1208 and 1210 may iteratively loop for any remaining PRT neural networks and signal summers. In some embodiments, the method 1200 may not continue to block 1212 until a final iteration of block 1210 is executed. For example, a final iteration of block 1210 may be executed by the processor, the encoder, and/or the final signal summer.

In block 1212, the wireless communication device and/or the training device may generate an output of an augmentation neural network (e.g., augmentation neural network 508). The augmentation neural network may generate an output as described in the method 1400 with reference to FIG. 14. In some embodiments, the processor, the encoder, and/or the augmentation neural network may generate the output of the augmentation neural network in block 1212.

In block 1214, the wireless communication device and/or the training device may output a transmission waveform. The transmission waveform may be time domain combined signals generated by the final iteration of combining the time domain data signals and the time domain PRTs combined with the output of the augmentation neural network, generating the time domain combined signals in block 1210. In some embodiments, the processor, the encoder, and/or the signal summer may output the transmission waveform in block 1214.

FIG. 13 illustrates an example of a method for implementing reconstructing time domain data signal from a transmission waveform using neural networks in accordance with various embodiments. With reference to FIGS. 1-13, the method 1300 may be implemented in a computing device (e.g., base station 110*a*-110*d*, 350, 402, wireless device 120*a*-120*e*, 200, 320, 404, transmitter 700, receiver 702), in general purpose hardware, in dedicated hardware, in software executing in a processor (e.g., processor 210, 212, 214, 216, 218, 252, 256, 260, 428, 432), or in a combination of a software-configured processor and dedicated hardware, such as a processor executing software within an peak reduction encoder and/or decoder system (e.g., processor 210, 212, 214, 216, 218, 252, 256, 260, 428, 432, encoder 500, decoder 600) that includes other individual components, and various memory/cache controllers. In order to encompass the alternative configurations enabled in various embodiments, the hardware implementing the method 1300 is referred to herein as a "wireless communication device" and/or a "training device." In some embodiments, the method 1300 may include operations performed in block 1016 of the method 1000 as described reference to FIG. 10 and in block 1112 of the method 1100 as described with reference to FIG. 11.

In block 1302, the wireless communication device and/or the training device may equalize a transmission waveform generating an equalized time domain signal. Equalization of the transmission waveform may undo the effect of the propagation channel on the frequency response of the transmission waveform. Equalization of the transmission waveform may generate an equalized time domain signal ($y_n$) (e.g., equalized time domain signal 624, 628). Equalization of the transmission waveform may be implemented using any known equalization process. In some embodiments, a processor, a decoder, and/or a channel equalizer component (e.g., channel equalizer component 610) may equalize the transmission waveform generating the equalized time domain signal in block 1302.

In block 1304, the wireless communication device and/or the training device may extract time domain PRTs from the equalized time domain signal. Time domain PRTs ($p_n$) may be extracted from the equalized time domain signal (e.g., equalized time domain signal 624). In some embodiments, the processor, the decoder, and/or a time domain PRT extractor component (e.g., time domain PRT extractor component 612) may extract the time domain PRTs from the equalized time domain signal in block 1304.

In block 1306, the wireless communication device and/or the training device may generate feature maps based on the equalized time domain signal and the extracted time domain PRTs. Feature maps of the equalized time domain signal (e.g., feature maps of the equalized time domain signal 620), such as two real number feature maps or one complex number feature map, may be generated. Feature maps of a function of the equalized time domain signal (e.g., feature maps of a function of the equalized time domain signal 622), such as two real number feature maps or one complex number feature map of the function $y_n|y_n|^2$, may be generated. Feature maps of the time domain PRTs extracted from the equalized time domain signal (e.g., feature maps of the time domain PRTs 626), such as two real number feature maps or one complex number feature map, may be generated. In some embodiments, the processor, the decoder, the channel equalizer component, and/or the time domain PRT extractor component may generate feature maps based on the equalized time domain signal and the extracted time domain PRTs in block 1306.

In block 1308, the wireless communication device and/or the training device may input the feature maps to a receiver neural network (e.g., receiver neural network 604). The receiver neural network may receive the feature maps of the equalized time domain signal, the feature maps of the function of the equalized time domain signal, and the feature maps time domain PRTs as inputs. In some embodiments, the feature maps may be input to a first layer of the receiver neural network (e.g., first neural network layer 614a). In some embodiments, the first layer of the receiver neural network may be a 1-dimensional convolutional neural network layer having a 3-channel kernel. In some embodiments, the processor, the decoder, the channel equalizer component, the time domain PRT extractor component, the receiver neural network, and/or the first layer of the receiver neural network may input the feature maps to a receiver neural network in block 1308.

In block 1310, the wireless communication device and/or the training device may generate a demodulated transmission waveform using the receiver neural network. The first neural network layer may process the input feature maps and output a first activation. The first activation output by the first neural network layer may be input to a second neural network layer (e.g., second neural network layer 616a) (e.g., a residual neural network (ResNet) block having a 3-channel kernel). The second neural network layer may process the input first activation and output a second activation. The second activation output by the second neural network layer may be input to a third neural network layer (e.g., third neural network layer 616b) (e.g., a ResNet block having a 3-channel kernel). The third neural network layer may process the input second activation and output a third activation. The third activation output by the third neural network layer may be input to a fourth neural network layer (e.g., fourth neural network layer 614b) (e.g., a 1-dimensional convolutional neural network layer having a 1-channel kernel). The fourth neural network layer may process the input third activation and output demodulated transmission waveform in the time domain. In some embodiments, the processor, the decoder, the receiver neural network, and/or the first, second, third, and/or fourth layer of the receiver neural network may generate the demodulated transmission waveform using the receiver neural network in block 1310.

In block 1312, the wireless communication device and/or the training device may combine the demodulated transmission waveform and the equalized time domain signals generating a time domain reconstruction of the data signals. The demodulated transmission waveform output by the fourth neural network layer and the equalized time domain signals (e.g., equalized time domain signals 628) may be input to a signal summer (e.g., signal summer 618). In some embodiments, the demodulated transmission waveform and the equalized time domain signals may be added. The result of combining the demodulated transmission waveform and the equalized time domain signals may be time domain reconstruction of the data signals. In some embodiments, the processor, the decoder, and/or the first, second, third, and/or the signal summer may combine the demodulated transmission waveform and the equalized time domain signals generating the time domain reconstruction of the data signals in block 1312.

Figure 14:
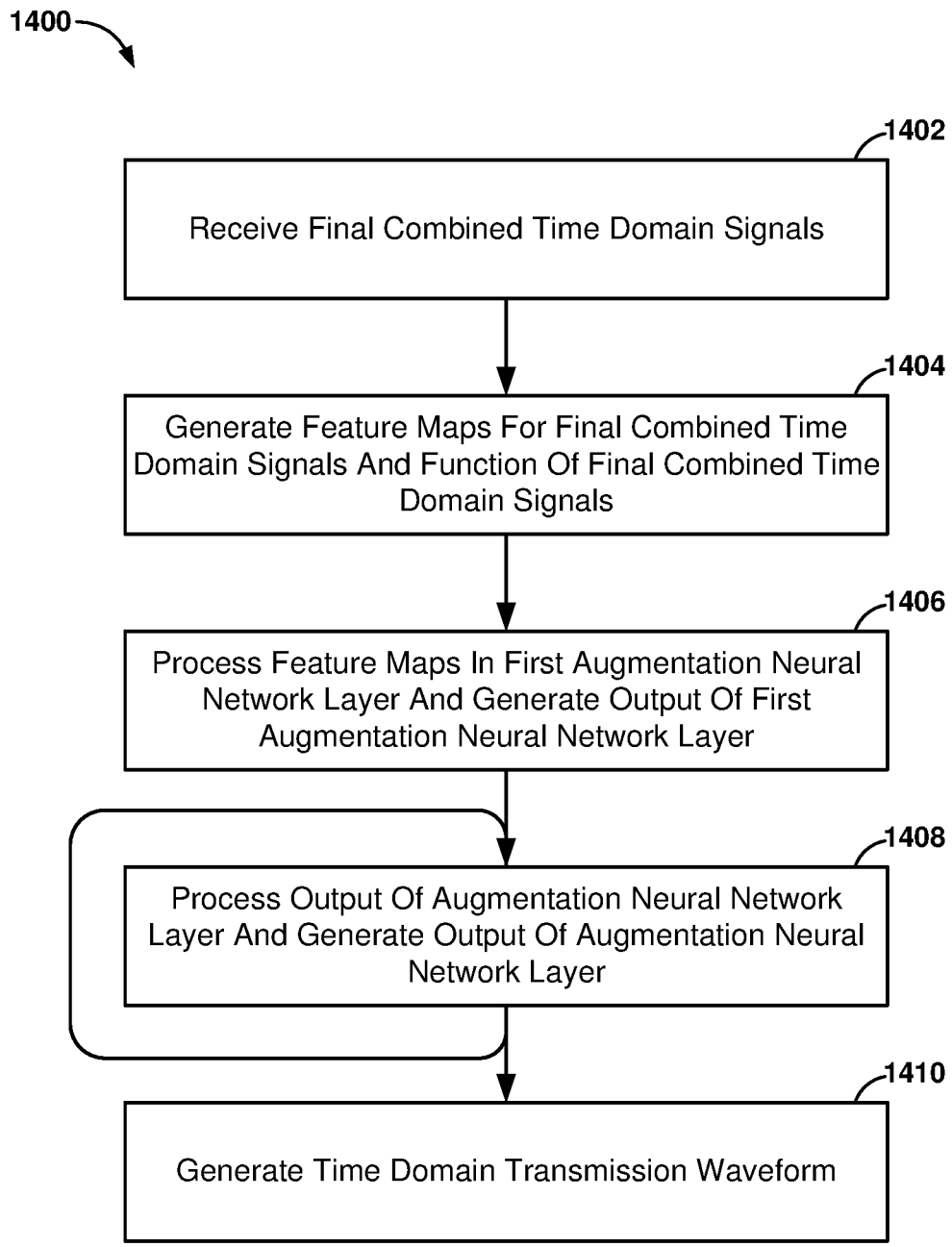
FIG. 14 is a process flow diagram illustrating an example of a method for generating an augmentation neural network output in accordance with various embodiments.

FIG. 14 illustrates and an example of a method for generating a transmission waveform from data tones using neural networks in accordance with some embodiments. With reference to FIGS. 1-14, the method 1400 may be implemented in a computing device (e.g., base station 110a-110d, 350, 402, wireless device 120a-120e, 200, 320, 404, transmitter 700, receiver 702), in general purpose hardware, in dedicated hardware, in software executing in a processor (e.g., processor 210, 212, 214, 216, 218, 252, 256, 260, 428, 432), or in a combination of a software-configured processor and dedicated hardware, such as a processor executing software within an peak reduction encoder and/or decoder system (e.g., processor 210, 212, 214, 216, 218, 252, 256, 260, 428, 432, encoder 500, decoder 600) that includes other individual components, and various memory/cache controllers. In order to encompass the alternative configurations enabled in various embodiments, the hardware implementing the method 1400 is referred to herein as a "wireless communication device" and/or a "training device." In some embodiments, the method 1400 may further describe operations performed in block 1212 of the method 1200 as described with reference to FIG. 12.

In block 1402, the wireless communication device and/or the training device may receive final combined time domain signals. The final combined time domain signals may be the combined time domain signals resulting from a last combination of the time domain combined signals and the time domain PRTs in block 1210 of the method 1200 as described with reference to FIG. 12. In some embodiments, a processor, an encoder, and/or an augmentation neural network (e.g., augmentation neural network 508) may receive final combined time domain signals in block 1402.

In block 1404, the wireless communication device and/or the training device may generate feature maps for final combined time domain signals and a function of final combined time domain signals. The final combined time domain signals ($x_n$) may be used to generate feature maps (e.g., feature maps 516) of the final combined time domain signals, such as a real number feature map and a complex number feature map. The final combined time domain signals ($x_n$) may be used to generate feature maps (e.g., feature maps 518) of a function of the final combined time domain signals, such as two real number feature maps or one complex number feature map of the function $x_n|x_n|^2$. In some embodiments, the processor, the encoder, the augmentation neural network, and/or a feature map generator (e.g., feature map generator 510) may generate feature maps for the final combined time domain signals and a function of final combined time domain signals in block 1404.

In block 1406, the wireless communication device and/or the training device may process the feature maps in a first augmentation neural network layer (e.g., first neural network layer 512a) and generate an output of the first augmentation neural network layer. The feature maps may be input to a first layer of the augmentation neural network, a 1-dimensional convolutional neural network layer having a 3-channel kernel. The first layer of the augmentation neural network may process the feature maps and output a first activation output resulting from the processing. In some embodiments, the processor, the encoder, the augmentation neural network, and/or a first layer of the augmentation neural network may process the feature maps and generate an output in block 1406.

In block 1408, the wireless communication device and/or the training device may process an output of an augmentation neural network layer (e.g., second neural network layer 514*a*, third neural network layer 514*b*, fourth neural network layer 514*c*, fifth neural network layer 512*b*) and generate an output of the augmentation neural network layer. An activation output of a previous layer of the augmentation neural network may be input to a successive layer of the augmentation neural network. For example, the activation output of the first layer of the augmentation neural network may be input to a second layer of the augmentation neural network, such as a 1-dimensional ResNet layer having a 3-channel kernel. The successive layer of the augmentation neural network may process the input activation and output a successive activation output resulting from the processing. In some embodiments, the processor, the encoder, the augmentation neural network, and/or a second, third, fourth, and/or fifth layer of the augmentation neural network may process an output of an augmentation neural network layer and generate an output in block 1408.

In some embodiments block 1408 may iteratively loop for any remaining augmentation neural network layers. In some embodiments, the method 1400 may not continue to block 1410 until a final iteration of block 1408 is executed. For example, a final iteration of block 1408 may be executed by the processor, the encoder, the augmentation neural network, and/or the fifth layer of the augmentation neural network.

In block 1410, the wireless communication device and/or the training device may generate time domain transmission waveform. The output of the final neural network layer may be combined with the final combined time domain signals by a signal summer (e.g., signal summer 520) generating the time transmission waveform to be transmitted to a receiver. In some embodiments, the signal summer may add the output of the final neural network layer and the final combined time domain signals to generate the time transmission waveform. In some embodiments, the processor, the encoder, the augmentation neural network, and/or the signal summer may generate the time domain transmission waveform in block 1410.

Figure 15:
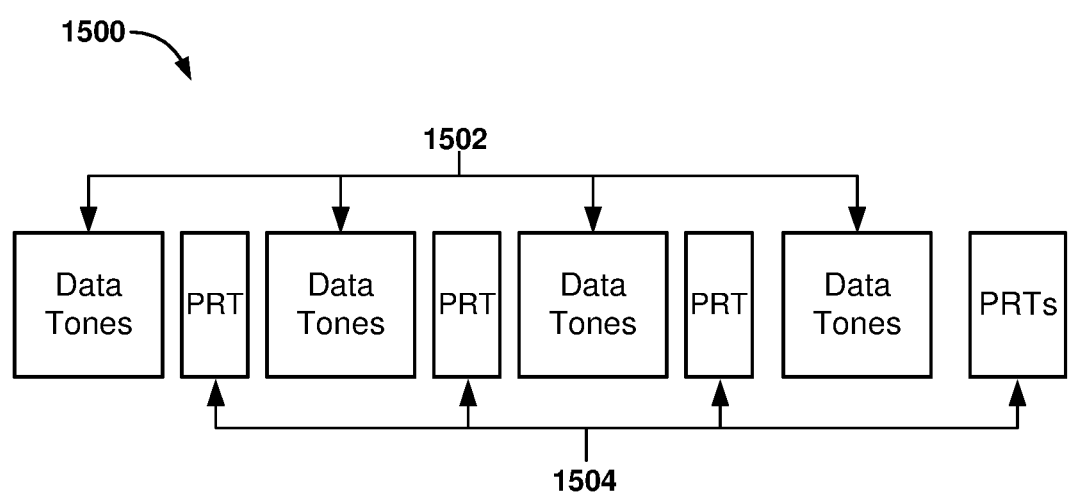
FIG. 15 is a carrier signal block diagram illustrating an example of a transmission waveform having data tones and PRTs on orthogonal subcarriers in accordance with various embodiments.

FIG. 15 illustrates and an example of a transmission waveform 1500 having time domain data signals and time domain PRTs on orthogonal subcarriers 1502, 1504 in accordance with various embodiments. With reference to FIGS. 1-15, an encoder (e.g., encoder 500) on a transmitter (e.g., transmitter 700) may generate a transmission waveform 1500 from time domain data signals and time domain PRTs generated from the frequency domain data tones by a set of PRT neural networks (e.g., set of PRT neural networks 502*a*, 502*b*) and an augmentation neural network (e.g., augmentation neural network 508). The time domain data signals on data tone subcarriers 1502 and time domain PRTs on orthogonal subcarriers 1504 may be combined by a signal summer (e.g., 520) of the transmitter (e.g., 700) through frequency division multiplexing. The time domain data signals and time domain PRTs may be transmitted by the transmitter on orthogonal subcarriers 1502, 1504. The time domain PRTs maybe be transmitted on subcarriers 1504 orthogonal to subcarriers 1502 reserved for the data tones.

Figure 16:
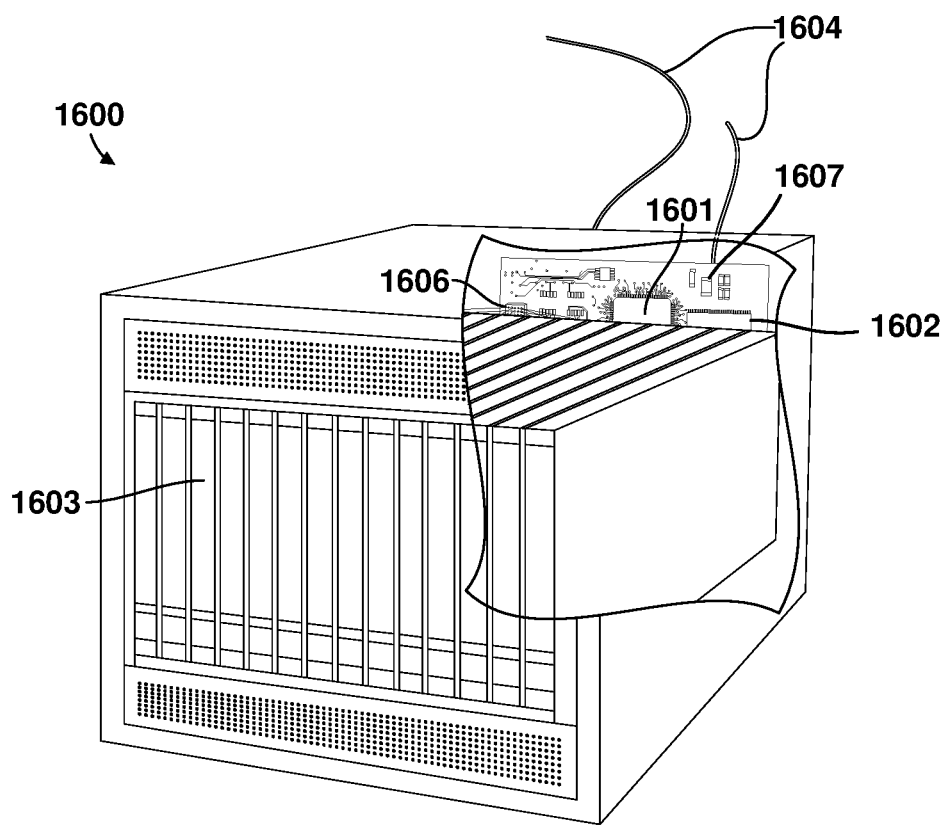
FIG. 16 is a component block diagram illustrating an example network computing device.

Various embodiments, including methods 900, 1000, 1100, 1200, 1300, and 1400 may be performed in a variety of network computing devices (e.g., in a base station 110*a*-110*d*, 350, 402), an example of which is illustrated in FIG. 16, which illustrates an example of a network computing device 1600. With reference to FIGS. 1-15, the network computing device 1600 may function as a network element of a communication network, such as a base station. The network computing device 1600 may include a processor 1601 coupled to volatile memory 1602 and a large capacity nonvolatile memory, such as a disk drive 1603. The network computing device 1600 also may include a peripheral memory access device such as a floppy disc drive, compact disc (CD) or digital video disc (DVD) drive 1606 coupled to the processor 1601. The network computing device 1600 also may include network access ports 1604 (or interfaces) coupled to the processor 1601 for establishing data connections with a network, such as the Internet or a local area network coupled to other system computers and servers. The network computing device 1600 may include one or more antennas 1607 for sending and receiving electromagnetic radiation that may be connected to a wireless communication link. The network computing device 1600 may include additional access ports, such as USB, Firewire, Thunderbolt, and the like for coupling to peripherals, external memory, or other devices.

Figure 17:
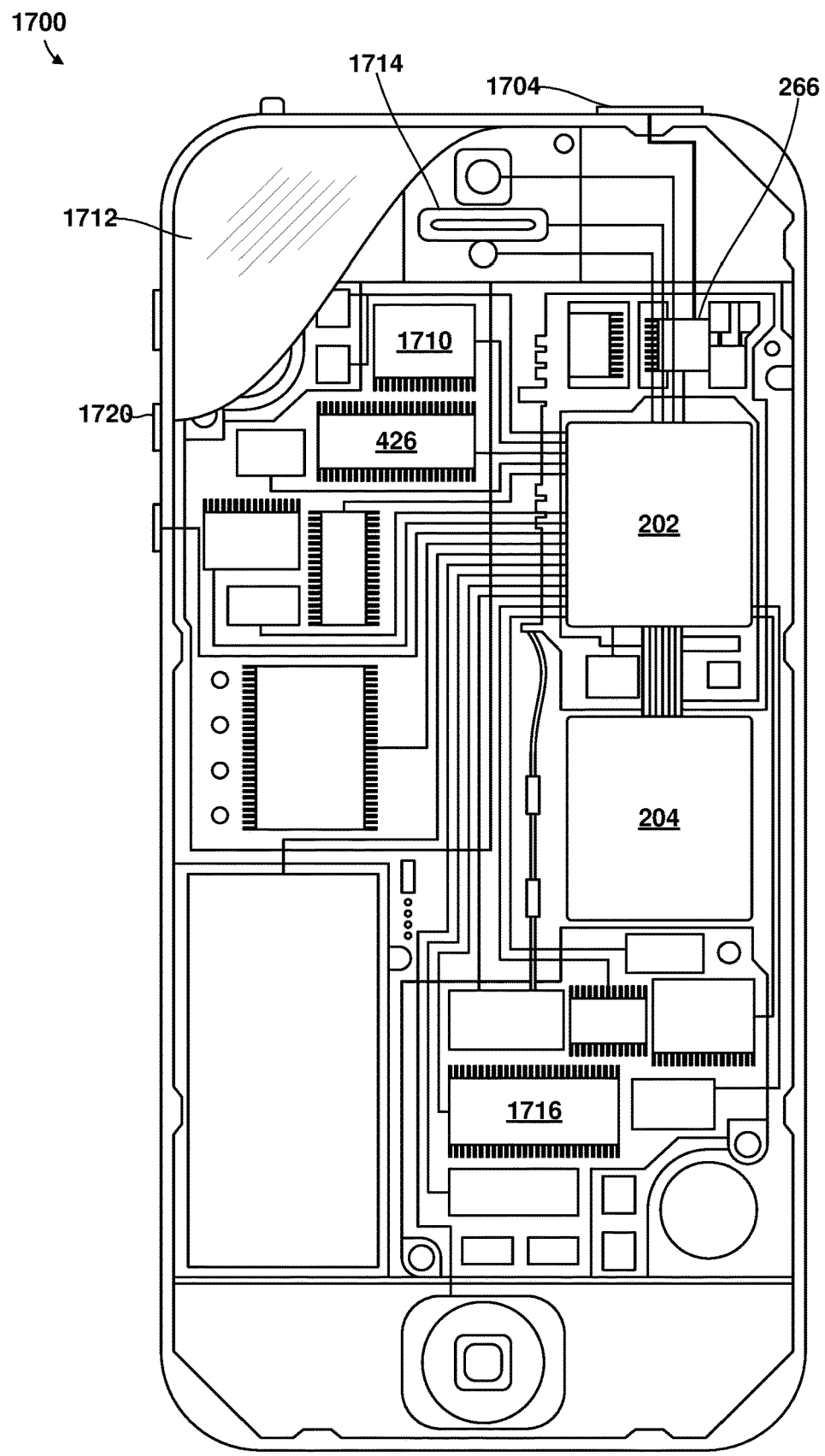
FIG. 17 is a component block diagram illustrating an example wireless device.

Various embodiments, including methods 900, 1000, 1100, 1200, 1300, and 1400 may be performed in a variety of wireless devices (e.g., the wireless device 120*a*-120*e*, 200, 320, 404), an example of which is illustrated in FIG. 17, which illustrates and example of a wireless device 1700 suitable for use with various embodiments. With reference to FIGS. 1-15, a wireless device 1700 may include a first SOC 202 (e.g., a SOC-CPU) coupled to a second SOC 204 (e.g., a 5G capable SOC). The first and second SOCs 202, 204 may be coupled to internal memory 426, 1716, a display 1712, and to a speaker 1714. Additionally, the wireless device 1700 may include an antenna 1704 for sending and receiving electromagnetic radiation that may be connected to a wireless data link and/or cellular telephone transceiver 266 coupled to one or more processors in the first and/or second SOCs 202, 204. The wireless device 1700 may also include menu selection buttons or rocker switches 1720 for receiving user inputs.

The wireless device 1700 also may include a sound encoding/decoding (CODEC) circuit 1710, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1710 may include a digital signal processor (DSP) circuit (not shown separately).

The processors of the network computing device 1600 and the wireless device 1700 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 426, 1602, 1603, 1716 before they are accessed and loaded into the processor. The processors may include internal memory sufficient to store the application software instructions.

Implementation examples are described in the following paragraphs. While some of the following implementation examples are described in terms of example methods, further example implementations include: the example methods discussed in the following paragraphs implemented by a transmitter wireless communication device including a processing device configured with processor-executable instructions to perform operations of the example methods; the example methods discussed in the following paragraphs implemented by a wireless computing device including means for performing functions of the example methods; and the example methods discussed in the following paragraphs implemented as a non-transitory, processor-readable medium having stored thereon processor-executable instructions configured to cause a processor of a wireless computing device to perform operations of the example methods.

Example 1. A method for reducing peak to average power ratio of wireless transmission waveforms, performed in transmitter circuitry of a wireless communication device, the method including receiving frequency domain data tones, transforming the frequency domain data tones to time domain data signals, generating, using a set of peak reduction tone (PRT) neural networks, time domain PRTs using the time domain data signals, in which the set of PRT neural networks have been trained in conjunction with an augmentation neural network and a receiver neural network, generating an output of the augmentation neural network based on an input of final combined time domain signals including the time domain PRTs combined with previous combined time domain signals, and generating time domain wireless transmission waveforms that include the output of the augmentation neural network combined with the final combined time domain signals.

Example 2. The method of example 1, further including generating real number feature maps of the final combined time domain signals and real number feature maps of a function of the final combined time domain signals, in which generating the output of the augmentation neural network based on the input of final combined time domain signals includes generating the output of the augmentation neural network based on an input of real number feature maps of the final combined time domain signals and the real number feature maps of the function of the final combined time domain signals.

Example 3. The method of example 1, further including generating a complex number feature map of the final combined time domain signals and a complex number feature map of a function of the final combined time domain signals, in which generating the output of the augmentation neural network based on the input of final combined time domain signals includes generating the output of the augmentation neural network based on an input of the complex number feature map of the final combined time domain signals and the complex number feature map of the function of the final combined time domain signals.

Example 4. The method of any of examples 1-3, further including training the augmentation neural network using a weighted average of a first error and a second error, in which the first error is from a comparison of a reconstruction of the frequency domain data tones and the frequency domain data tones, and wherein the second error is of a distortion function output based on an energy outside an allocated band.

Example 5. The method of example 4, further including training the set of PRT neural networks using the weighted average of the first error and the second error.

Example 6. The method of any of examples 1-5, further including determining whether the wireless communication device is configured to implement the augmentation neural network, and selecting a neural network implementation from a group of neural network implementations based on a modulation and coding scheme in response to determining that the wireless communication device is configured to implement the augmentation neural network.

Example 7. The method of any of examples 1-6, further including transmitting the time domain wireless transmission waveforms to another wireless communication device having the receiver neural network.

Example 8. The method of any of examples 1-7, further including receiving a neural network indicator, from another wireless communication device having the receiver neural network, configured to indicate to the wireless communication device the augmentation neural network that has been trained with the set of PRT neural networks and the receiver neural network, and selecting the augmentation neural network based on the neural network indicator from a plurality of augmentation neural networks.

Example 9. The method of example 8, further including receiving weights for the augmentation neural network from the other wireless communication device, in which generating the time domain wireless transmission waveforms that include the output of the augmentation neural network combined with the final combined time domain signals includes generating the time domain wireless transmission waveforms using the weights for the augmentation neural network.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given implementation are not necessarily limited to the associated implementation and may be used or combined with other embodiments that are shown and described. Further, the claims are not intended to be limited by any one example implementation. For example, one or more of the operations of the methods disclosed herein may be substituted for or combined with one or more operations of the methods disclosed herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative logics, logical blocks, modules, components, circuits, and algorithm operations described in connection with the embodiments disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented as hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Embodiments of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the embodiments described in this disclosure may be readily apparent to those skilled in the art, and the generic principles defined herein may be applied to other embodiments without departing from the spirit or scope of this disclosure. Thus, the claims are not intended to be limited to the embodiments shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate embodiments also can be implemented in combination in a single implementation. Conversely, various features that are described in the context of a single implementation also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A method for reducing peak to average power ratio of wireless transmission waveforms, performed in transmitter circuitry of a wireless communication device, the method comprising:
    receiving frequency domain data tones;
    transforming the frequency domain data tones to time domain data signals;
    generating, using a set of peak reduction tone (PRT) neural networks, time domain PRTs using the time domain data signals, wherein the set of PRT neural networks have been trained in conjunction with an augmentation neural network and a receiver neural network;
    generating an output of the augmentation neural network based on an input of final combined time domain signals including the time domain PRTs combined with previous combined time domain signals; and
    generating time domain wireless transmission waveforms that include the output of the augmentation neural network combined with the final combined time domain signals.

2. The method of claim 1, further comprising generating real number feature maps of the final combined time domain signals and real number feature maps of a function of the final combined time domain signals,
    wherein generating the output of the augmentation neural network based on the input of final combined time domain signals comprises generating the output of the augmentation neural network based on an input of real number feature maps of the final combined time domain signals and the real number feature maps of the function of the final combined time domain signals.

3. The method of claim 1, further comprising generating a complex number feature map of the final combined time domain signals and a complex number feature map of a function of the final combined time domain signals,
    wherein generating the output of the augmentation neural network based on the input of final combined time domain signals comprises generating the output of the augmentation neural network based on an input of the complex number feature map of the final combined time domain signals and the complex number feature map of the function of the final combined time domain signals.

4. The method of claim 1, further comprising training the augmentation neural network using a weighted average of a first error and a second error, wherein the first error is from a comparison of a reconstruction of the frequency domain data tones and the frequency domain data tones, and wherein the second error is of a distortion function output based on an energy outside an allocated band.

5. The method of claim 4, further comprising training the set of PRT neural networks using the weighted average of the first error and the second error.

6. The method of claim 1, further comprising:
    determining whether the wireless communication device is configured to implement the augmentation neural network; and
    selecting a neural network implementation from a group of neural network implementations based on a modulation and coding scheme in response to determining that the wireless communication device is configured to implement the augmentation neural network.

7. The method of claim 1, further comprising transmitting the time domain wireless transmission waveforms to another wireless communication device having the receiver neural network.

8. The method of claim 1, further comprising:
    receiving a neural network indicator, from another wireless communication device having the receiver neural network, configured to indicate to the wireless communication device the augmentation neural network that has been trained with the set of PRT neural networks and the receiver neural network; and
    selecting the augmentation neural network based on the neural network indicator from a plurality of augmentation neural networks.

9. The method of claim 8, further comprising receiving weights for the augmentation neural network from the other wireless communication device, wherein generating the time domain wireless transmission waveforms that include the output of the augmentation neural network combined with the final combined time domain signals comprises generating the time domain wireless transmission waveforms using the weights for the augmentation neural network.

10. A transmitter wireless communication device, comprising:
    a processing device configured with processor-executable instructions to perform operations comprising:
        receiving frequency domain data tones;
        transforming the frequency domain data tones to time domain data signals;
        generating, using a set of peak reduction tone (PRT) neural networks, time domain PRTs using the time domain data signals, wherein the set of PRT neural networks have been trained in conjunction with an augmentation neural network and a receiver neural network;
        generating an output of the augmentation neural network based on an input of final combined time domain signals including the time domain PRTs combined with previous combined time domain signals; and
        generating time domain wireless transmission waveforms that include the output of the augmentation neural network combined with the final combined time domain signals.

11. The transmitter wireless communication device of claim 10, wherein the processing device is configured with processor-executable instructions to perform operations further comprising generating real number feature maps of the final combined time domain signals and real number feature maps of a function of the final combined time domain signals,
    wherein the processing device is configured with processor-executable instructions to perform operations such that generating the output of the augmentation neural network based on the input of final combined time domain signals comprises generating the output of the augmentation neural network based on an input of real number feature maps of the final combined time domain signals and the real number feature maps of the function of the final combined time domain signals.

12. The transmitter wireless communication device of claim 10, wherein the processing device is configured with processor-executable instructions to perform operations further comprising generating a complex number feature map of the final combined time domain signals and a complex number feature map of a function of the final combined time domain signals, wherein the processing device is configured with processor-executable instructions to perform operations such that generating the output of the augmentation neural network based on the input of final combined time domain signals comprises generating the output of the augmentation neural network based on an input of the complex number feature map of the final combined time domain signals and the complex number feature map of the function of the final combined time domain signals.

13. The transmitter wireless communication device of claim 10, wherein the processing device is configured with processor-executable instructions to perform operations further comprising training the augmentation neural network using a weighted average of a first error and a second error, wherein the first error is from a comparison of a reconstruction of the frequency domain data tones and the frequency domain data tones, and wherein the second error is of a distortion function output based on an energy outside an allocated band.

14. The transmitter wireless communication device of claim 13, wherein the processing device is configured with processor-executable instructions to perform operations further comprising training the set of PRT neural networks using the weighted average of the first error and the second error.

15. The transmitter wireless communication device of claim 10, wherein the processing device is configured with processor-executable instructions to perform operations further comprising:
determining whether the transmitter wireless communication device is configured to implement the augmentation neural network; and
selecting a neural network implementation from a group of neural network implementations based on a modulation and coding scheme in response to determining that the transmitter wireless communication device is configured to implement the augmentation neural network.

16. The transmitter wireless communication device of claim 10, wherein the processing device is configured with processor-executable instructions to perform operations further comprising transmitting the time domain wireless transmission waveforms to another wireless communication device having the receiver neural network.

17. The transmitter wireless communication device of claim 10, wherein the processing device is configured with processor-executable instructions to perform operations further comprising:
receiving a neural network indicator, from another wireless communication device having the receiver neural network, configured to indicate to the transmitter wireless communication device the augmentation neural network that has been trained with the set of PRT neural networks and the receiver neural network; and
selecting the augmentation neural network based on the neural network indicator from a plurality of augmentation neural networks.

18. The transmitter wireless communication device of claim 17, wherein the processing device is configured with processor-executable instructions to perform operations further comprising receiving weights for the augmentation neural network from the other wireless communication device, wherein generating the time domain wireless transmission waveforms that include the output of the augmentation neural network combined with the final combined time domain signals comprises generating the time domain wireless transmission waveforms using the weights for the augmentation neural network.

19. A wireless computing device, comprising:
means for receiving frequency domain data tones;
means for transforming the frequency domain data tones to time domain data signals;
means for generating, using a set of peak reduction tone (PRT) neural networks, time domain PRTs using the time domain data signals, wherein the set of PRT neural networks have been trained in conjunction with an augmentation neural network and a receiver neural network;
means for generating an output of the augmentation neural network based on an input of final combined time domain signals including the time domain PRTs combined with previous combined time domain signals; and
means for generating time domain wireless transmission waveforms that include the output of the augmentation neural network combined with the final combined time domain signals.

20. The wireless computing device of claim 19, further comprising means for generating real number feature maps of the final combined time domain signals and real number feature maps of a function of the final combined time domain signals,
wherein means for generating the output of the augmentation neural network based on the input of final combined time domain signals comprises means for generating the output of the augmentation neural network based on an input of real number feature maps of the final combined time domain signals and the real number feature maps of the function of the final combined time domain signals.

21. The wireless computing device of claim 19, further comprising means for generating a complex number feature map of the final combined time domain signals and a complex number feature map of a function of the final combined time domain signals,
wherein means for generating the output of the augmentation neural network based on the input of final combined time domain signals comprises means for generating the output of the augmentation neural network based on an input of the complex number feature map of the final combined time domain signals and the complex number feature map of the function of the final combined time domain signals.

22. The wireless computing device of claim 19, further comprising means for training the augmentation neural network using a weighted average of a first error and a second error, wherein the first error is from a comparison of a reconstruction of the frequency domain data tones and the frequency domain data tones, and wherein the second error is of a distortion function output based on an energy outside an allocated band.

23. The wireless computing device of claim 22, further comprising means for training the set of PRT neural networks using the weighted average of the first error and the second error.

24. The wireless computing device of claim 19, further comprising:
means for determining whether the wireless computing device is configured to implement the augmentation neural network; and
means for selecting a neural network implementation from a group of neural network implementations based on a modulation and coding scheme in response to determining that the wireless computing device is configured to implement the augmentation neural network.

25. The wireless computing device of claim 19, further comprising means for transmitting the time domain wireless transmission waveforms to another wireless computing device having the receiver neural network.

26. The wireless computing device of claim 19, further comprising:
means for receiving a neural network indicator, from another wireless computing device having the receiver neural network, configured to indicate to the wireless computing device the augmentation neural network that has been trained with the set of PRT neural networks and the receiver neural network; and
means for selecting the augmentation neural network based on the neural network indicator from a plurality of augmentation neural networks.

27. The wireless computing device of claim 26, further comprising means for receiving weights for the augmentation neural network from the other wireless computing device, wherein means for generating the time domain wireless transmission waveforms that include the output of the augmentation neural network combined with the final combined time domain signals comprises means for generating the time domain wireless transmission waveforms using the weights for the augmentation neural network.

28. A non-transitory, processor-readable medium having stored thereon processor-executable instructions configured to cause a processor of a wireless computing device to perform operations comprising:
receiving frequency domain data tones;
transforming the frequency domain data tones to time domain data signals;
generating, using a set of peak reduction tone (PRT) neural networks, time domain PRTs using the time domain data signals, wherein the set of PRT neural networks have been trained in conjunction with an augmentation neural network and a receiver neural network;
generating an output of the augmentation neural network based on an input of final combined time domain signals including the time domain PRTs combined with previous combined time domain signals; and
generating time domain wireless transmission waveforms that include the output of the augmentation neural network combined with the final combined time domain signals.

29. The non-transitory, processor-readable medium of claim 28, wherein the processor-executable instructions are configured to cause the processor of the wireless computing device to perform operations further comprising generating real number feature maps of the final combined time domain signals and real number feature maps of a function of the final combined time domain signals,
wherein the processor-executable instructions are configured to cause the processor of the wireless computing device to perform operations such that generating the output of the augmentation neural network based on the input of final combined time domain signals comprises generating the output of the augmentation neural network based on an input of real number feature maps of the final combined time domain signals and the real number feature maps of the function of the final combined time domain signals.

30. The non-transitory, processor-readable medium of claim 28, wherein the processor-executable instructions are configured to cause the processor of the wireless computing device to perform operations further comprising generating a complex number feature map of the final combined time domain signals and a complex number feature map of a function of the final combined time domain signals,
wherein the processor-executable instructions are configured to cause the processor of the wireless computing device to perform operations such that generating the output of the augmentation neural network based on the input of final combined time domain signals comprises generating the output of the augmentation neural network based on an input of the complex number feature map of the final combined time domain signals and the complex number feature map of the function of the final combined time domain signals.

* * * * *